(12) United States Patent
Stroganov

(10) Patent No.: US 9,140,273 B2
(45) Date of Patent: Sep. 22, 2015

(54) METHOD OF CONVERSION OF HEAT INTO FLUID POWER AND DEVICE FOR ITS IMPLEMENTATION

(76) Inventor: Alexander Anatolyevich Stroganov, St. Petersburg (RU)

( * ) Notice: Subject to any disclaimer, the term of this patent is extended or adjusted under 35 U.S.C. 154(b) by 264 days.

(21) Appl. No.: 13/577,012

(22) PCT Filed: Dec. 30, 2010

(86) PCT No.: PCT/RU2010/000823
§ 371 (c)(1),
(2), (4) Date: Aug. 3, 2012

(87) PCT Pub. No.: WO2011/115523
PCT Pub. Date: Sep. 22, 2011

(65) Prior Publication Data
US 2012/0297761 A1 Nov. 29, 2012

(30) Foreign Application Priority Data
Mar. 17, 2010 (RU) ................. 2010111398

(51) Int. Cl.
*F01B 29/10* (2006.01)
*F15B 11/072* (2006.01)

(52) U.S. Cl.
CPC ....... *F15B 11/0725* (2013.01); *F15B 2211/212* (2013.01); *F15B 2211/214* (2013.01); *F15B 2211/216* (2013.01); *F15B 2211/62* (2013.01)

(58) Field of Classification Search
CPC ............... F15B 11/0725; F15B 11/032; F15B 2211/212–2211/216; F15B 2211/62; F15B 1/02; F15B 1/027; B60Y 2400/15; Y02T 10/6208; E02F 9/2217; B60K 6/12

USPC ........... 60/325, 329, 396, 413–416, 508–515, 60/547.1–547.3, 597, 650, 659, 668, 682, 60/696, 721; 91/4 R, 5
See application file for complete search history.

(56) References Cited

U.S. PATENT DOCUMENTS 2,089,915 A * 8/1937 Gilli ................................ 122/35
3,608,311 A * 9/1971 Roesel ............................ 60/516

(Continued)

FOREIGN PATENT DOCUMENTS

JP 57032038 A * 2/1982 .............. F02G 1/043
RU 2266418 C1 12/2005

(Continued)

*Primary Examiner* — Thomas Denion
*Assistant Examiner* — Mickey France
(74) *Attorney, Agent, or Firm* — Ralph E. Jocke; Walker & Jocke

(57) ABSTRACT

A method and apparatus for conversion of heat into liquid fluid power includes at least two hydropneumatic (hp) accumulators, each having a gas reservoir and a liquid reservoir therein separated by a movable separator. Liquid added to a liquid reservoir of a first accumulator causes gas compression in the gas reservoir of the accumulator. Gas is conducted from the first accumulator through a heat exchanger and into a gas reservoir of a second accumulator. Expansion of the gas in the second accumulator causes working liquid to be expelled from the second accumulator. After expansion of the gas in the second accumulator, working liquid is added to the liquid reservoir of the second accumulator gas is conducted through a cooling heat exchanger to the gas reservoir of the first accumulator, causing working liquid to be expelled. The fluid power produced through the expelled working liquid is stored or utilized to operate hydraulic devices.

32 Claims, 8 Drawing Sheets

(56) References Cited

U.S. PATENT DOCUMENTS

Figure 1:
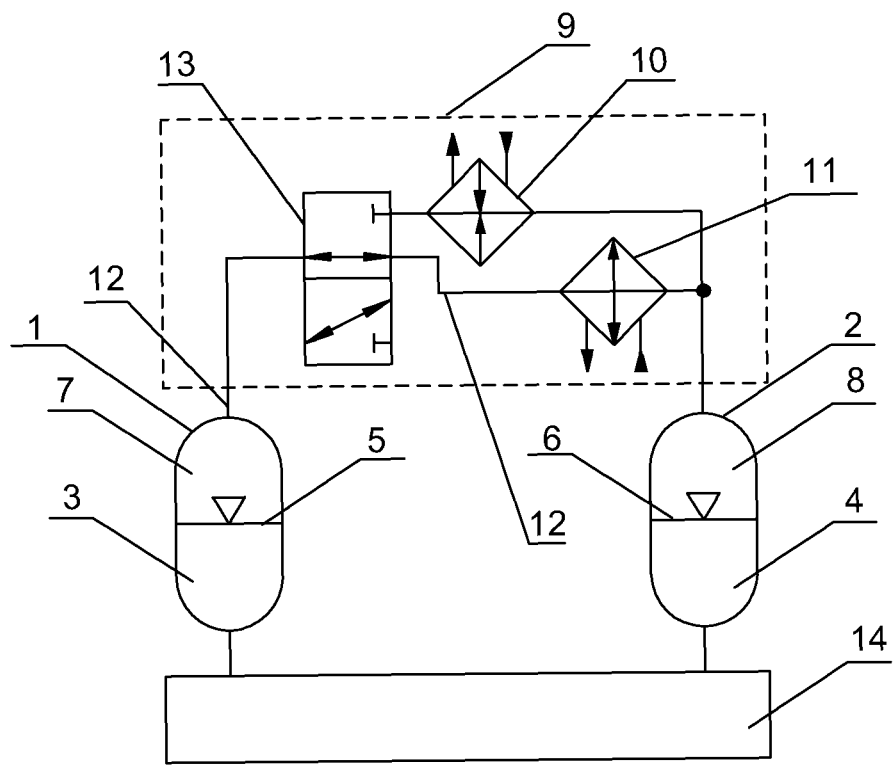

| | | | | |
|---|---|---|---|---|
| 3,648,458 A * | 3/1972 | McAlister | | 60/415 |
| 3,708,979 A * | 1/1973 | Bush et al. | | 60/522 |
| 3,803,847 A * | 4/1974 | McAlister | | 60/721 |
| 3,830,065 A * | 8/1974 | McAlister | | 60/670 |
| 3,901,033 A * | 8/1975 | McAlister | | 60/516 |
| 3,987,629 A * | 10/1976 | Pecar | | 60/516 |
| 4,246,978 A * | 1/1981 | Schulz et al. | | 180/165 |
| 4,255,929 A * | 3/1981 | Frosch et al. | | 60/517 |
| 5,096,469 A * | 3/1992 | Keefer | | 95/92 |
| 5,579,640 A | 12/1996 | Gray et al. | | |
| 5,771,693 A * | 6/1998 | Coney | | 60/407 |
| 5,865,086 A * | 2/1999 | Petichakis | | 91/4 R |
| 5,881,801 A | 3/1999 | Hayakawa et al. | | |
| 5,934,076 A * | 8/1999 | Coney | | 60/617 |
| 5,971,027 A | 10/1999 | Beachley et al. | | |
| 6,116,138 A | 9/2000 | Achten | | |
| 7,475,538 B2 | 1/2009 | Bishop | | |
| 7,503,418 B2 * | 3/2009 | Mann | | 180/305 |
| 7,603,858 B2 * | 10/2009 | Bennett | | 60/517 |
| 7,637,457 B2 * | 12/2009 | Bennett | | 244/59 |
| 7,694,514 B2 * | 4/2010 | Smith et al. | | 60/517 |
| 2005/0155347 A1* | 7/2005 | Lewellin | | 60/508 |
| 2007/0163260 A1* | 7/2007 | Hargreaves et al. | | 60/650 |
| 2010/0133903 A1* | 6/2010 | Rufer et al. | | 307/22 |
| 2010/0300097 A1* | 12/2010 | Van De Loo et al. | | 60/641.8 |
| 2010/0329891 A1* | 12/2010 | Fong et al. | | 417/53 |
| 2011/0167825 A1* | 7/2011 | Mauran et al. | | 60/670 |

FOREIGN PATENT DOCUMENTS

| | | | | |
|---|---|---|---|---|
| RU | 2355900 C2 | | 5/2009 | |
| SU | 1243969 A | * | 7/1986 | B60K 17/00 |
| SU | 1516611 A1 | | 10/1989 | |

* cited by examiner

METHOD OF CONVERSION OF HEAT INTO FLUID POWER AND DEVICE FOR ITS IMPLEMENTATION

The invention refers to mechanical engineering and can be used for effective conversion of heat from various sources, including the sun, internal or external combustion engines, high-temperature fuel cells, geothermal sources, etc. into fluid power.

STATE OF THE ART

There is a method of conversion heat into fluid power implemented in the device disclosed in U.S. Pat. No. 5,579,640. The method includes pumping the working liquid into a hydropneumatic accumulator (hereinafter the accumulator) with gas compression, gas expansion with displacement of the liquid from the accumulator as well as heat supply to the gas and heat removal from the gas performed so that the average gas temperature during expansion should be higher than that during compression.

The method has been implemented by means of the device including at least two hydropneumatic accumulators (named "the first and the second liquid tanks" by the authors). In each accumulator the liquid reservoir communicating with the means for supply and intake of the liquid is separated by a movable separator from the gas reservoir communicating with the means of heating and cooling made with the possibility of heating and cooling the incoming gas. The heating and cooling means include gas receivers (named "the first and the second gas vessels" by the authors), each of them communicating with the gas reservoir of the respective (first or second) accumulator, as well as means of gas heating and cooling in the receivers (named, respectively, "the first and the second means of heating and cooling" by the authors) and a control system made with the possibility of alternating gas cooling and heating in the receivers. The means for supply and intake of the liquid include a hydraulic pump and a hydraulic motor as well as valves.

Heat is supplied to the gas in the receiver from the hot heat transfer medium through the walls of the heating heat exchanger which is placed either outside the receiver and transfers heat to the gas through the walls of the receiver or is placed inside the receiver transferring heat to the gas through its own strong walls. It is proposed to use exhaust gases of internal combustion engines, for example, as the hot heat transfer medium.

Heat from the gas in the receiver is extracted to the external cooling heat transfer medium either directly through the walls of the receiver or through the strong walls of a separate cooling heat exchanger placed inside the receiver. It is proposed to use the ambient air or water as a cooling heat transfer medium.

The switching from heat supply to heat removal and back is effected by turning off the flow of the hot heat transfer medium and turning on the flow of the cooling heat transfer medium and vice versa using the valves.

Each accumulator with its receiver and the means of heating and cooling is a separate converter of heat into fluid power. Gas reservoirs of different accumulators do not communicate while liquid reservoirs are connected to the means for supply and intake of the liquid via separate valves. To reduce pulsations of input and output flows in said device two and more converters of this kind are used so that pumping of liquid into the accumulator of one converter should correspond to displacement of liquid from the accumulator of the other converter.

In each converter of this kind the aforesaid method is implemented as a cyclic process including four consecutive stages:
  pumping of the working liquid from the means for supply and intake of the liquid into the accumulator with gas compression and its displacement from the accumulator into the receiver and with removal of heat from the gas in the receiver to the external cooling heat transfer medium,
  isochoric heating of the gas in the receiver by supplying heat from the hot heat transfer medium, for example, to it,
  gas expansion with its displacement from the receiver into the accumulator, with displacement of the liquid from the accumulator into the means for supply and intake of the liquid and with continued supply of heat to the gas in the receiver from the hot heat transfer medium, for example,
  isochoric cooling of the gas by removing heat from the gas in the receiver to the external cooling heat transfer medium.

Due to supply of heat to the gas at the stages of isochoric heating and subsequent expansion as well as heat removal from the gas at the stages of isochoric cooling and subsequent compression, the average temperature (and, consequently, the average pressure) of the gas during expansion is higher than during compression; therefore, the gas expansion work exceeds the gas compression work. As a result, some part of the heat is converted into additional fluid power.

However, cyclic heating and cooling of the gas occurs in the same volume of the gas receiver, which implies cyclic heating and cooling not only the gas but also heat exchangers as well as the walls of the receiver. There is heat exchange between the gas at high pressure (hundreds of bars) and heat-exchange media at low pressure (down to units of bars for exhaust gases). Heat exchangers of relevant strength as well as the walls of the receiver are massive and their thermal capacity is considerably (at least dozens of times) higher than the thermal capacity of the gas in the receiver. Their thermal capacity is much higher (hundreds and thousands of times) than thermal capacity of atmospheric air and exhaust gases pumped through heat exchangers per second.

As a result, thermal inertia of the device is high while the gas cooling and heating rates are low, which reduces the speed of operation and the average power density of the device and is the first substantial shortcoming of the proposed solution. Gas heating and cooling in the receiver occurs due to the gas heat conductivity and natural convection, which also reduces the heating and cooling speeds and related specific power.

In this case most heat of the external source is spent on heating massive heat exchangers and walls of the receiver cooled at the previous stages of the cycle rather than on conversion into fluid power. Upon completion of the gas expansion the heat accumulated in the heat exchanger is transferred to the cooling heat transfer medium and released. Therefore, the heat utilization efficiency appears to be low, which is the second and most essential shortcoming of the proposed solution. The use of the heat removed from one of the receivers during its cooling to heat another receiver proposed by the authors allows decreasing heat losses by not more than 50%.

Additional heat losses occur when the flow of heated gas enters the accumulator where it blows over the walls of the gas reservoir of the accumulator and gives heat to them fast.

It should be also noted that in the proposed solution increasing the thermodynamic efficiency of the gas cycle is principally incompatible with increasing the general efficiency of conversion of the heat of an external source into fluid power. Striving to increase the gas cycle efficiency the authors suggest heating the gas in the receiver until the gas temperature in the receiver approaches the temperature of the hot heat transfer medium. It is similarly proposed to cool the gas in the receiver until its temperature equals the temperature of the ambient air or another cooling heat transfer medium. However, as the temperature of the heat exchanger approaches the temperature of the hot heat transfer medium the part of the heat removed from the heat transfer medium to the heat exchanger tends towards zero. Thus, despite the growing thermodynamic efficiency of the gas cycle the efficiency of conversion of the heat of the external source into fluid power drops even lower. The speed and average power drop as well because the process of temperature equalization in the receiver is asymptotic.

Cyclic heating and cooling of the body of the receiver and heat exchangers under high pressure accelerates their fatigue breakdown and decreases the reliability and safety of the proposed device. Besides, the need to switch the flow of the hot heat transfer medium by means of the valves reduces the reliability of the device, especially at the use of internal combustion engine exhaust gases combining high temperature (to 800-900° C.) and chemical aggressiveness. A failure of the valve switching the exhaust gas flow may result either in dangerous uncontrolled overheating of the gas in the receiver with increased pressure over the maximum permissible level or to a failure of the internal combustion engine in case of a blocked exhaust duct.

Thus, the low efficiency and rate of heat conversion into fluid power, low specific power and low reliability are the major shortcomings of the proposed solution. Another essential shortcoming of the proposed solution is the impossibility of accumulating heat and generating fluid power during temporary shutdown or flow reduction of the hot heat-transfer medium.

Essence of the Invention

The objective of the present invention is to increase the efficiency and speed of conversion of heat into fluid power.

Another objective of the present invention is to increase power density and reliability of the device converting heat into fluid power.

Another objective of the present invention is to ensure the possibility of heat storage and conversion into fluid power during temporary shutdown or reduction of the heat supply power.

Method

The method of heat conversion into fluid power proposed for achieving these objectives includes pumping of the working liquid into the fluid reservoir of at least one hydropneumatic (hp) accumulator (hereinafter the accumulator) with gas compression in its gas reservoir as well as gas expansion in the gas reservoir of at least one accumulator with displacement of the fluid from its fluid reservoir as well as heat supply to the gas and heat removal from the gas performed so that the average gas temperature during expansion is higher than that during compression.

The objective is achieved by ensuring that heat is supplied to the gas by transferring the gas through a hotter heat exchanger and heat is removed from the gas by transferring the gas through another, colder heat exchanger, with at least two accumulators being used and with the gas being transferred between different accumulator through said heat exchangers.

To maintain the heat exchanger hotter it is brought into a thermal contact with the heat source (by means of heat conductivity, radiation or heat transfer by the flow of the heating heat-transfer medium). To maintain the heat exchanger colder it is brought into a thermal contact with the cooling heat-transfer medium. Due to the fact that the average gas temperature during expansion is higher (and, hence, the average gas pressure is higher as well) than that during compression the gas expansion work exceeds the gas compression work. As a result, some part of the heat carried from the heat source to the cooling heat-transfer medium via the heat exchangers and the gas flow is converted into additional fluid power that can be used to perform mechanical work. For pumping the working liquid and to use the additional fluid power obtained at displacement of the liquid by the hotter gas, means of supply and intake of liquid are used that may include hydraulic pumps and motors or hydraulic pressure transformers (hereinafter hydraulic transformers).

Due to the gas transfer via heat exchangers between different accumulators it is the transferred gas only rather than the massive heat exchangers that is subject to cyclic heating and cooling. This results in much lower heat losses and increased efficiency of heat conversion into fluid power.

Forced convection of the gas flowing through the heat exchangers ensures its high heating and cooling rate, which allows conversion of the heat of an external source into fluid power at a high rate and specific power.

Elimination of cyclic heating and cooling of the heat exchangers and other elements of the heating and cooling means being under high pressure increases their reliability and safety of heat conversion into fluid power.

The heat accumulated in the hotter heat exchanger is not released and can be used for conversion into fluid power during temporary shutdown or reduction of the power of the external heat source.

To reduce heat losses when the walls of the gas reservoir of the accumulator are blown over by the flow of the heated or cooled gas, the walls of the gas reservoir of at least one accumulator are maintained colder and the gas is transferred into it through the colder heat exchanger while the walls of the gas reservoir of another accumulator are maintained hotter and the gas is transferred into it through the hotter heat exchanger.

To reduce gas heat losses through the accumulator separator caused by the temperature difference of the gas and liquid in the accumulator, the walls of the liquid reservoir of at least one accumulator and the working liquid in it are maintained colder while the walls of the liquid reservoir of at least one other accumulator and the working liquid in it are maintained hotter.

To prevent heat losses with working liquid flows the invention provides for both heat insulation of the flows and heat regeneration when the hotter (or colder) working liquid is pumped and displaced.

For heat regeneration the working liquid displaced out of at least one accumulator is passed through the regenerating liquid heat exchanger. When the working liquid is pumped into this accumulator, it is passed through the same regenerating liquid heat exchanger in the opposite direction.

For heat insulation of the liquid flows, the hotter working liquid is separated from the colder working liquid by at least one movable heat insulator.

For operation with increased difference of temperatures between the accumulators one working liquid is used in the colder liquid reservoir while another working liquid is used in the hotter liquid reservoir, these two different working liquids being separated by at least one movable separator. This movable separator may also be a movable heat insulator: for example, a piston made of a low heat conductivity material (polymer or ceramic) or an elastic separator coated with open-cell foamed elastomer.

The use of a high-temperature organic (based on diphenyl or diphenyloxide for example) or silicon-organic (based on dimethylsiloxane for example) working liquid allows the temperature of the hotter accumulator and the working liquid in it to be maintained at 300-400 C. The use of an inorganic working liquid (molten tin or other metal, for example) allows raising the maximum temperature higher up to the temperature stress limit of the material of the accumulator walls.

The increased temperature of the hotter accumulator and the working liquid in it increase the efficiency of conversion heat into fluid power, especially when heat losses with liquid flows are eliminated in the aforesaid ways.

The stable temperature condition of the strong shells of the accumulators under high pressure also increases their reliability and safety of heat conversion into fluid power. For the gas compression process to approach an isothermal one, at least three accumulators are used, with the walls of the gas reservoirs in at least two of them being maintained colder and the gas being transferred between them with compression through the colder heat exchanger.

For the gas expansion process to approach an isothermal one, at least three accumulators are used, with the walls of the gas reservoirs in at least two of them being maintained hotter and the gas being transferred between them with expansion through the hotter heat exchanger.

To increase the maximal gas temperature above the maximal permissible temperature of the working liquid or separator in at least one accumulator the walls of the gas reservoir are separated from the heated gas flow by means of thermal protection.

To bring the processes of gas compression or expansion closer to isothermal ones and further increase of efficiency of heat conversion into fluid power in the gas reservoir of at least one accumulator a forced gas convection is created using a gas circulating pump (hereinafter referred to as a gas blower for brevity).

Both external gas blowers and gas blowers embodied inside the accumulator (in its housing or in the gas reservoir) are used.

For a better approach to isothermality the forced convection is created by transferring the gas by means of the gas blower through at least one heat exchanger with gas withdrawal from the gas reservoir of at least one accumulator and gas return to the same gas reservoir. It is preferred that to reduce heating and cooling losses in the gas lines the gas from this gas reservoir should be withdrawn through one gas line and returned through another gas line.

The gas blower can be actuated by electric, hydraulic or other motors via the shaft or another kinematic link of the drive provided with seals preventing compressed gas leakages. To reduce leakage and friction losses in the seals the kinematic links of the gas blower drive it is actuated by a hydromotor working at close pressures of the liquid (preferably differing from the gas pressure in the gas blower by not more than several bars). It is preferred that the hydromotor should be actuated by the liquid flowing between this hydromotor and the liquid reservoir of at least one of said accumulators when liquid is pumped into it or is displaced out of it through this hydromotor.

To increase the thermodynamic efficiency, especially when compression or expansion are close to the isothermal ones, conversion is effected as a cycle with gas heat regeneration when at least at one stage heat is removed from gas with gas cooling and at least at one stage heat is supplied to the gas with gas heating, while some part of the heat removed from the gas at the cooling stage is used for supply to the gas at the heating stage. For that purpose heat is removed from the gas at the cooling stage to the regenerating heat exchanger and heat is supplied to the gas at the heating stage first from the regenerating heat exchanger and then from the external source of heat.

When using the heat effectively given away by the source at high temperature, a high-temperature fuel cell, for example, as well as heat of the sun or another source of radiant energy, the use of a separate regenerating heat exchanger is preferred. At the gas cooling stage gas is passed first through the separate regenerating heat exchanger in the cooling direction and then through the colder heat exchanger while at the gas heating stage it is passed first through the regenerating heat exchanger in the heating direction, preferably opposite to the cooling direction, and then through the hotter heat exchanger.

When heat is transferred from the source by means of a hot heat transfer medium released after heat removal (exhaust gases, for example) a counterflow hotter heat exchanger is used to increase the efficiency. Gas is transferred through it during heat supply in the direction opposite to the direction of the hot heat transfer medium flow so that heat is supplied to the gas entering the heat exchanger from the heat transfer medium leaving the heat exchanger while heat is supplied to the gas leaving the heat exchanger from the heat transfer medium entering the heat exchanger. This ensures both higher gas heating rate and the cooling rate of the hot heat transfer medium (for example, outgoing flows of end products of fuel combustion or water steam). It is preferred that this very counterflow heat exchanger (or part of it) should be used as the regenerating heat exchanger, with gas passed through it (or part of it) in one direction during cooling and in the opposite direction during heating.

At the increased degree of heat regeneration the gas cycles including two isotherms and two isobars (or two other stages equidistant in "temperature-entropy" coordinates, for example, two isochors) approach the generalized Carnot cycles that allow heat conversion into gas work at the maximal thermodynamic efficiency.

To reduce hydromechanical losses the part of the liquid exposed to considerable pressure changes during transfer through the hydromechanical devices is reduced. For that purpose gas is transferred between the gas reservoirs of the accumulator pumping liquid into the liquid reservoir of at least one accumulator and displacing liquid from the liquid reservoir of at least one other accumulator. A liquid flow is created between the liquid reservoirs of these accumulators so that the pressure difference between any parts of the liquid in this flow does not exceed 30% of the liquid pressure in the liquid reservoir in which it is pumped to; it is preferred that this difference should not exceed 5% of said pressure.

In conventional accumulators each gas reservoir corresponds to one liquid reservoir, their pressure differing by a small value only related to friction at the piston separator travel or to deformation of the elastic separator. Said liquid flow between these accumulators is created by hydromechanical means of inter-accumulator liquid transfer (a liquid pump or a hydraulic transformer, for example) overpowering the pressure difference between the liquid reservoirs of the accumulators, the gas reservoirs of which communicate via heat exchangers.

Said pressure difference between different parts of the liquid flow passing between the liquid reservoirs of the accumulators, with the gas reservoirs communicating via heat exchangers, is determined by the resistance of the heat exchangers; communication lines (gas and liquid ones) as well as by the efficiency of hydromechanical means of inter-accumulator liquid transfer. Compared to the total pressure of the liquid in the accumulator, this pressure difference is small (preferably does not exceed several bars). Therefore, the losses related to leakages and friction in the hydromechanical means of inter-accumulator liquid transfer are also small.

Said hydromechanical means may include a fluid pump actuated by electric, hydraulic or other motor via the shaft or another kinematic link of the drive provided with seals preventing liquid leakages. To reduce losses of leakages and friction in the seals this liquid flow between the accumulators is preferably created by means of the hydraulic transformer having at least three liquid ports. For creating inter-accumulator liquid flow its two ports are connected with liquid ports of the respective accumulators and it is actuated by another flow of liquid flowing through its at least one other port. It is preferred that this other flow should be the differential one between the flow entering the hydraulic transformer from the accumulator (accumulators), from which the incoming gas displaces the liquid, and the flow leaving the hydraulic transformer into the accumulator (accumulators), in which the incoming liquid displaces the gas.

It is implied that different hydraulic transformers both with separate kinematically interconnected pumps and hydromotors (both rotor and linear ones) and integrated ones, for example, phase-regulated hydraulic transformers, with every cylinder working as a motor during one part of the revolution and as a pump during the other part, can be used.

In terms of compactness it is preferable to use at least one accumulator that combines the functions of hydropneumatic accumulator and hydraulic transformer. Such an accumulator includes at least two liquid reservoirs separated by one common piston separator from one gas reservoir. These liquid reservoirs have independent liquid ports and are separated from each another, which allows maintaining different pressures in them so that the total pressure force of the liquid on the separator balances the force of gas pressure on the separator. For the creation of the aforesaid inter-accumulator flow of liquid, the pressure of the liquid in at least one liquid reservoir of this accumulator is maintained above the gas pressure in the gas reservoir of this very accumulator, whereas the pressure of the liquid in at least one other liquid reservoir of this accumulator is maintained below said gas pressure. At least one of these liquid reservoirs connected with the liquid reservoir of at least one other accumulator participates in said inter-accumulator liquid flow while at least one other liquid reservoir of the same accumulator is used to maintain the proportion of liquid pressures in accordance with the gas transfer direction. The pressure in the liquid reservoir participating in the inter-accumulator liquid transfer is raised or reduced relative to the gas pressure by a value sufficient for creation of a liquid flow. For that purpose the pressure in the liquid reservoir not involved in the inter-accumulator liquid transfer is reduced or raised accordingly by the value necessary to keep the balance of the pressure forces on the piston separator. When gas is transferred to the gas reservoir of this accumulator, the said liquid flow is created to another accumulator from at least one of the liquid reservoirs of this accumulator maintaining the pressure in this liquid reservoir higher than the gas pressure in this gas reservoir while the pressure in at least one other liquid reservoir of the same accumulator is maintained less than said gas pressure. When gas is transferred from the gas reservoir of this accumulator, the said liquid flow is created from another accumulator to at least one of the liquid reservoirs of this accumulator maintaining the pressure in this liquid reservoir less than the gas pressure in this gas reservoir while the pressure in at least one other liquid reservoir of the same accumulator is maintained higher than said gas pressure.

The invention provides that the liquid flow is created through the hydraulic transformer and the necessary valves both directly between the liquid reservoirs of different accumulators and through an intermediate liquid buffer moving its movable separator or heat insulator.

For further reduction of hydromechanical losses the intake of displaced working liquid and its pumping are effected by means for supply and intake of liquid including a line with the first pressure and a line with the second pressure. Both the first and the second pressures are maintained high (preferably, dozens or hundreds of bars), with the second pressure being higher than the first one. Conversion is effected as the cycle including the stage of gas compression in the accumulator with the colder gas reservoir, the stage of gas transfer from it through the hotter heat exchanger into the accumulator with the hotter gas reservoir, the stage of gas expansion in the accumulator with the hotter gas reservoir as well as the stage of gas transfer from it through the colder heat exchanger into the accumulator with the colder gas reservoir.

The gas from the accumulator with the hotter gas reservoir is transferred into the accumulator with the colder gas reservoir at the working liquid pressure in the accumulator being less than the first pressure. The working liquid flow from the line with the first pressure to the liquid reservoir of the accumulator with the hotter gas reservoir is directed through the aforesaid hydraulic transformer that creates the above-described working liquid flow from the accumulator with the colder gas reservoir to the accumulator with the hotter gas reservoir.

The gas from the accumulator with the colder gas reservoir is transferred into the accumulator with the hotter gas reservoir at the working liquid pressure in the accumulators being higher than the second pressure. The working liquid flow from the liquid reservoir of the accumulator with the hotter gas reservoir to the line with the second pressure is directed through the aforesaid hydraulic transformer that creates the above-described working liquid flow from the accumulator with the hotter gas reservoir to the accumulator with the colder gas reservoir.

The gas in the accumulator (at least one) with the colder gas reservoir is compressed by pumping the working liquid into its liquid reservoir from the hydraulic transformer that is also connected to the lines with the first and second pressures. This hydraulic transformer is actuated by directing the liquid flow through it from the line with the second pressure. During gas compression the pressure of the liquid pumped from the hydraulic transformer into said liquid reservoir is raised by raising the ratio between the volumetric flow rate of the liquid flowing from the second line to the hydraulic transformer and the volumetric flow rate of the liquid flowing from the hydraulic transformer to said liquid reservoir.

The gas expansion in the accumulator (at least one) with the hotter gas reservoir is actuated by creation of the working liquid flow displacing from its liquid reservoir to the hydraulic transformer that is also connected to the lines with the first and second pressures. This flow actuates the hydraulic transformer with creation of the working liquid flow from it to the line with the second pressure. During gas expansion the pressure of the liquid displaced from said liquid reservoir into the hydraulic transformer is reduced by decreasing the ratio between the volumetric flow rate of the liquid flowing from the hydraulic transformer to the second line and the volumetric flow rate of the liquid flowing from said liquid reservoir to the hydraulic transformer.

Thus, as a result of every conversion cycle some part of the working liquid is transferred from the line with the first pressure to the line with the second, higher pressure. The sliding seals of the hydraulic transformers work under differential pressures rather than full pressures, which reduces the losses on leakages and friction.

The fluid power received by the aforesaid transfer of the liquid to the line with the second pressure can be used in the load connected between said lines with the first and second pressures. To extend the possibilities of using the obtained fluid power it is proposed to use the hydraulic transformer, its two ports being connected to said lines with the first and second pressures and two other ports being connected to the lines with the high and low output pressures. Thus, pressure decoupling is effected optimizing the efficiency of the gas cycle by choosing said first and second pressures in the lines and optimizing the load regime by choosing the high and low output pressures.

Device

The above-described method is proposed to be implemented by a device via conversion of the heat of an external source into fluid power including at least two hydropneumatic (hp) accumulators, wherein the liquid reservoir of each of them communicating with the means for supply and intake of liquid is separated by a movable separator from the gas reservoir communicating with the means of heating and cooling made with the possibility of heating and cooling of the inflowing gas.

The means of heating and cooling contain at least two gas heat exchangers installed with the possibility of gas transfer through them between gas reservoirs of different accumulators, while the means of heating and cooling are made with the possibility of maintaining at least one of the heat exchangers colder and at least one other heat exchanger hotter.

At least one heat exchanger is made with the possibility of supplying heat to the gas from an external heat source. At least one other heat exchanger is made with the possibility of removing heat from the gas to the cooling heat transfer medium. Hereinafter in the description of the working device the heat exchanger of the first type is called the hotter heat exchanger while the heat exchanger of the second type is called the colder heat exchanger. The heat exchanger made with the possibility of removing heat from the gas and supplying the removed heat to the gas is called the regenerating heat exchanger in similar cases.

To eliminate heat losses of cyclic heating and cooling of the walls of the gas reservoirs of the accumulators an embodiment is proposed in which the means of heating and cooling are made with the possibility of maintaining the walls of the gas reservoir of at least one accumulator colder and transferring gas into it through the colder heat exchanger while maintaining the walls of the gas reservoir of at least one other accumulator hotter and transferring gas into it through the hotter heat exchanger.

To eliminate heat losses through separators an embodiment is proposed in which the means of heating and cooling are made with the possibility of maintaining the walls of the liquid reservoir of at least one accumulator and the working liquid in it colder while maintaining the walls of the liquid reservoir of at least one other accumulator and the working liquid in it hotter.

To implement the method with regeneration of the working liquid heat, the means for supply and intake of liquid include at least one liquid regenerating heat exchanger. It is connected with the liquid reservoir of at least one accumulator and is made with the possibility of removing heat from the liquid during its displacement through it from this accumulator, and supplying the removed heat to the liquid during its pumping through it into the accumulator.

To implement the method with heat insulation of the hotter part of the working liquid from the colder one the means for supply and intake of liquid include at least one liquid buffer including two liquid reservoirs separated by a movable heat insulator.

To implement the method using different working liquids in different accumulators the means for supply and intake of liquid include at least one liquid buffer including two variable-volume reservoirs separated by a movable separator.

Each liquid reservoir of the aforementioned liquid buffers is installed with the possibility of communicating with the liquid reservoir of at least one accumulator.

To reduce the mass and dimensions of the device and the aggregate internal volume of the gas communication lines at least one gas heat exchanger is made in the housing of the accumulator, for example, as a gas port of this accumulator with the possibility of supplying heat to the gas or removing heat from the gas (preferably as a gas port with increased ratio between the area of the gas contacting surface and the volume). Due to elimination of two intermediate ports and the gas line the gas-dynamic losses during gas transfer through this heat exchanger are also reduced.

To implement the method with approaching the gas compression process closer to an isothermal one, the embodiment of the device is proposed including at least three accumulators while the means of heating and cooling are made with the possibility of maintaining the walls of gas reservoirs of at least two of the accumulators colder and gas transfer between them through the colder gas heat exchanger.

To implement the method with approaching the gas expansion process closer to an isothermal one, an embodiment of the device is proposed including at least three accumulators while the means of heating and cooling are made with the possibility of maintaining the walls of the gas reservoirs of at least two accumulators hotter and gas transfer between them through the hotter gas heat exchanger.

To reduce heat losses at least one accumulator is provided with thermal protection means made with the possibility of separating the walls of the gas reservoir from the incoming gas flow.

When gas is heated to less than 150-200 C, to reduce the losses of the separator friction and the cost said accumulator is made with an elastic separator while the means of thermal protection include a flexible porous heat insulator connected with the elastic separator.

When gas is heated to higher temperatures, said accumulator is preferably made with a piston separator while the means of thermal protection include a variable-length thermal screen installed along the side cylindrical walls of the gas reservoir of the accumulator as well as thermal screens installed opposite the separator and the gas reservoir bottom. For temperature above 300 C the said thermal screens are preferably made of metal while for lower temperatures they may be made of polymers, of organic-silicon polymers, for example.

To implement the method with approaching the gas compression or expansion processes closer to the isothermal ones, the means of gas heating and cooling include at least one gas circulating pump (hereinafter referred to as a gas blower for brevity) with the possibility of creation forced gas convection in the gas reservoir of at least one accumulator.

To improve isothermality the gas reservoir of at least one accumulator communicates with the means of gas heating and cooling by at least two gas lines with the possibility of gas removal by the gas blower from said gas reservoir via one of said gas lines, transfer of the removed gas through at least one heat exchanger and return of the gas to the same gas reservoir through the other gas line.

In the embodiment of the device preferable in terms of simplicity and reliability and containing a gas blower the means for supply and intake of liquid include at least one hydromotor kinematically connected with at least one gas blower, while the hydromotor is installed with the possibility of being actuated by the flow of liquid between it and the liquid reservoir of at least one accumulator.

To implement the method of conversion by cycle with heat regeneration the device is proposed with at least one gas heat exchanger embodied as a regenerating one, i.e. with the possibility of removing heat from gas when the gas is pumped through it in one direction and of supplying the heat removed from the gas to the gas when the gas is pumped through it in the opposite direction.

The invention provides the use of heat of various sources. The thermal contact of the hotter heat exchangers with them is effected either by means of heat conductivity or heat-and-mass transfer, including condensation heat transfer, or radiant heat transfer as well as their combinations.

To ensure thermal contact with the heat source by means of heat-and-mass transfer at least one heat exchanger has channels to pass an external heat-transfer medium with the possibility of supplying heat from this heat-transfer medium to the gas.

To increase efficiency when using a hot heat-transfer medium at least one heat exchanger is made as a counterflow one, i.e. it has channels to pass the external heat-transfer medium with the possibility of supplying heat from this heat-transfer medium to the gas so that heat is supplied to the gas entering the heat exchanger from the external heat-transfer medium leaving the heat exchanger while heat to the gas leaving the heat exchanger is supplied from the external heat-transfer medium entering the heat exchanger. For said heat exchanger to be used as a regenerating one, it has at least one additional port with the possibility of introducing gas into the heat exchanger while the means of heating and cooling contain at least one channel connecting the additional gas port with the accumulator and are made with the possibility of locking this channel.

To implement the method with creation of an inter-accumulator liquid flow an embodiment of the device is proposed where the means for supply and intake of liquid include means of inter-accumulator liquid transfer embodied with the possibility of creating a liquid flow between the liquid reservoirs of at least two accumulators so that the pressure difference between any parts of the liquid in this flow does not exceed 30% of the pressure of the liquid in that liquid reservoir into which it is pumped; preferably this difference does not exceed 5% of said pressure.

Different embodiments of the means of inter-accumulator liquid transfer are implied, with the use of both rotor and linear liquid pumps and hydromotors as well as with the use of hydraulic transformers in which the pump and motor are joined. In the latter case the means of inter-accumulator liquid transfer include at least one hydraulic transformer with at least three liquid ports installed with the possibility of communicating via its two ports with the liquid reservoirs of at least two accumulators and creating a liquid flow between them when the liquid flows through at least its one other port. Provision is made for use of various hydraulic transformers, for example, rotary axial-piston hydraulic transformers with phase control (as in U.S. Pat. No. 6,116,138) where every cylinder works as a motor during one part of the revolution and as a pump during the other part, or multi-chamber linear hydraulic transformers with digital control (as in U.S. Pat. No. 7,475,538).

In a more compact embodiment at least one accumulator combines the functions of a hydropneumatic accumulator and a hydraulic transformer as in U.S. Pat. No. 5,971,027. Such an accumulator includes at least two liquid reservoirs separated by one common piston separator from one gas reservoir while the means of inter-accumulator liquid transfer are made with the possibility of creating a liquid flow between at least one of the liquid reservoirs of this accumulator and at least one liquid reservoir of another accumulator.

To implement the method of conversion with transfer of liquid from the line with the first high pressure to the line with the second high pressure the means for supply and intake of liquid contain the first and second lines with the possibility of maintaining the first and second pressures, respectively, in them as well as the hydraulic transformer with at least three ports installed with the possibility of liquid exchange between said lines and the liquid reservoir of at least one accumulator at the pressure in this liquid reservoir different from said pressures in the lines.

To implement the method with the load pressure decoupling from said pressures in the lines the means for supply and intake of liquid include the hydraulic transformer with at least four ports installed with the possibility of connecting two ports with said first and second lines and connecting two other ports with two output lines and maintaining the pressures in the output lines different from said pressures in the first and second lines.

The details of the invention are shown in the examples given below illustrated by the drawings and graphs presenting:

FIG. 1—The device with two accumulators and two heat exchangers

Figure 2:
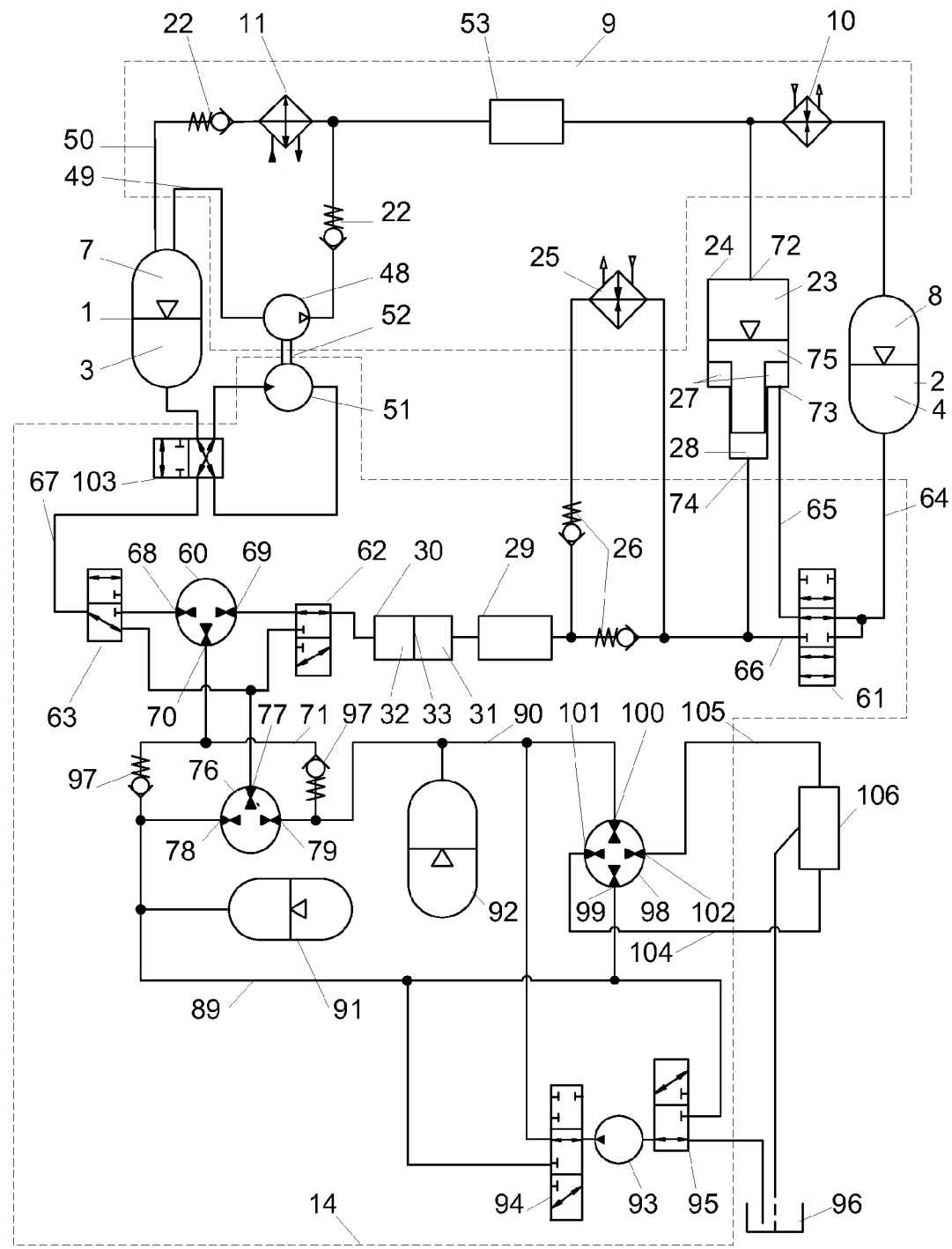

FIG. 2—The device with three accumulators, the gas blower, the gas regenerating heat exchanger, liquid heat exchangers and the liquid heat insulating buffer as well as with hydraulic transformers.

Figure 3:
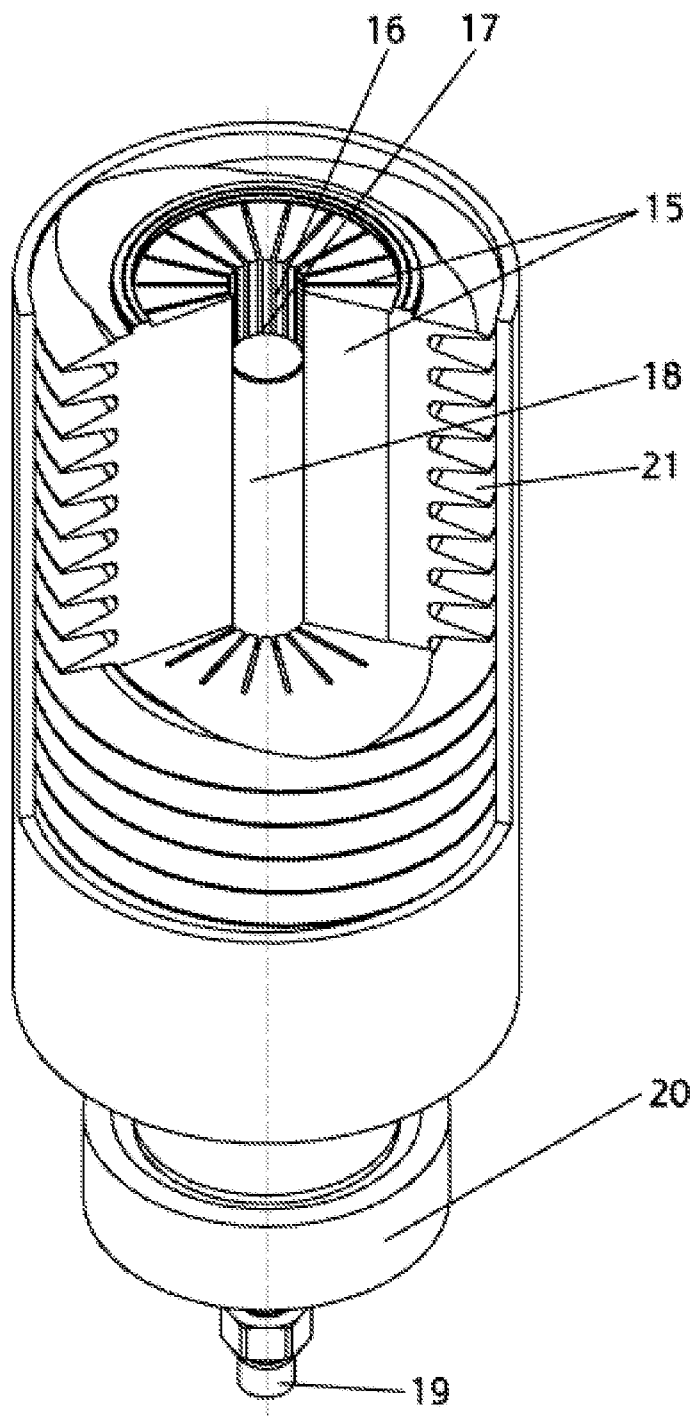

FIG. 3—The gas flow heat exchanger.

Figure 4:
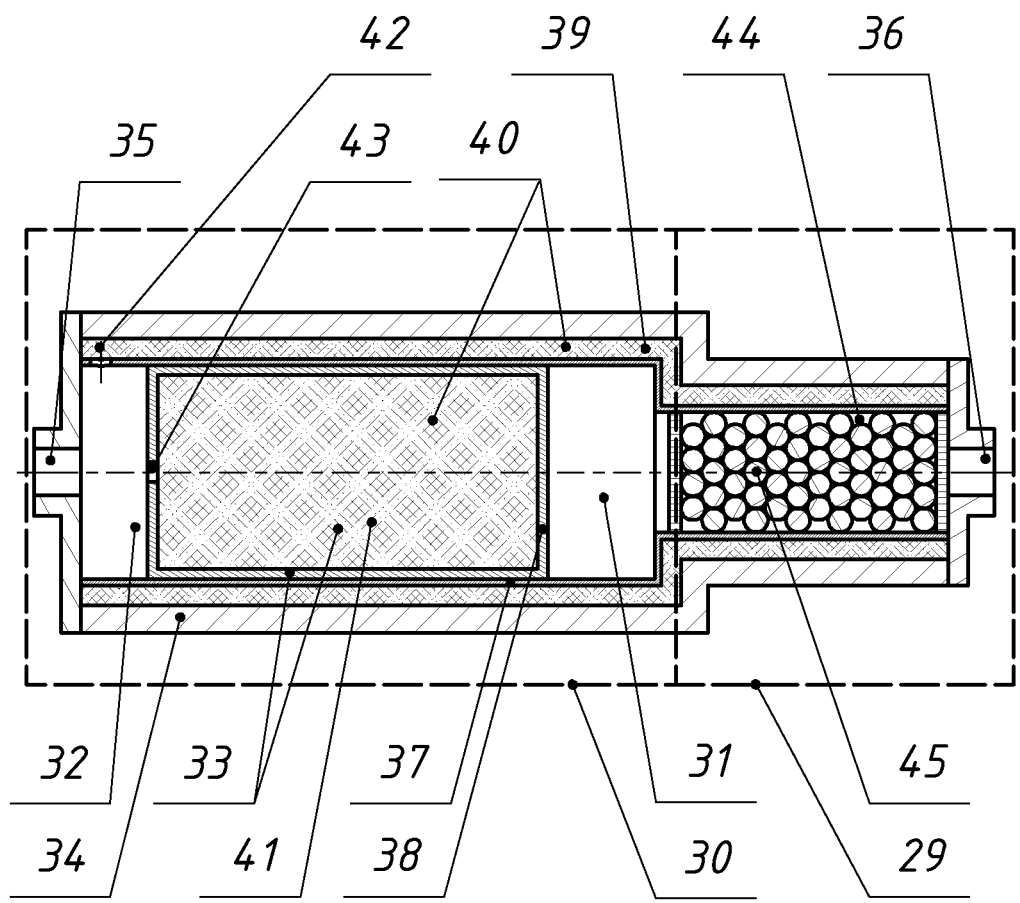

FIG. 4—The integrated embodiment of the liquid regenerating heat exchanger and the liquid heat insulating buffer.

Figure 5:
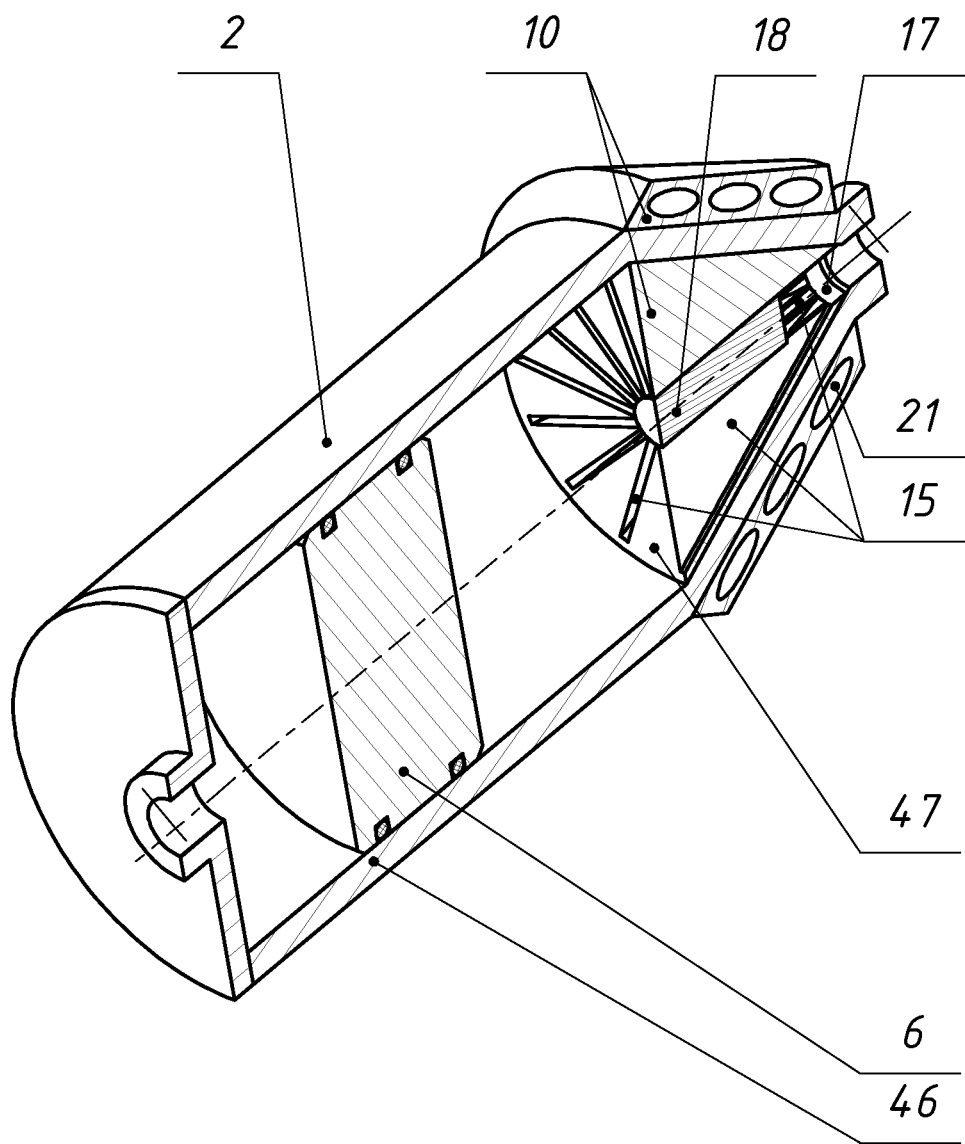

FIG. 5—The integrated embodiment of the accumulator and the gas flow heat exchanger.

Figure 6:
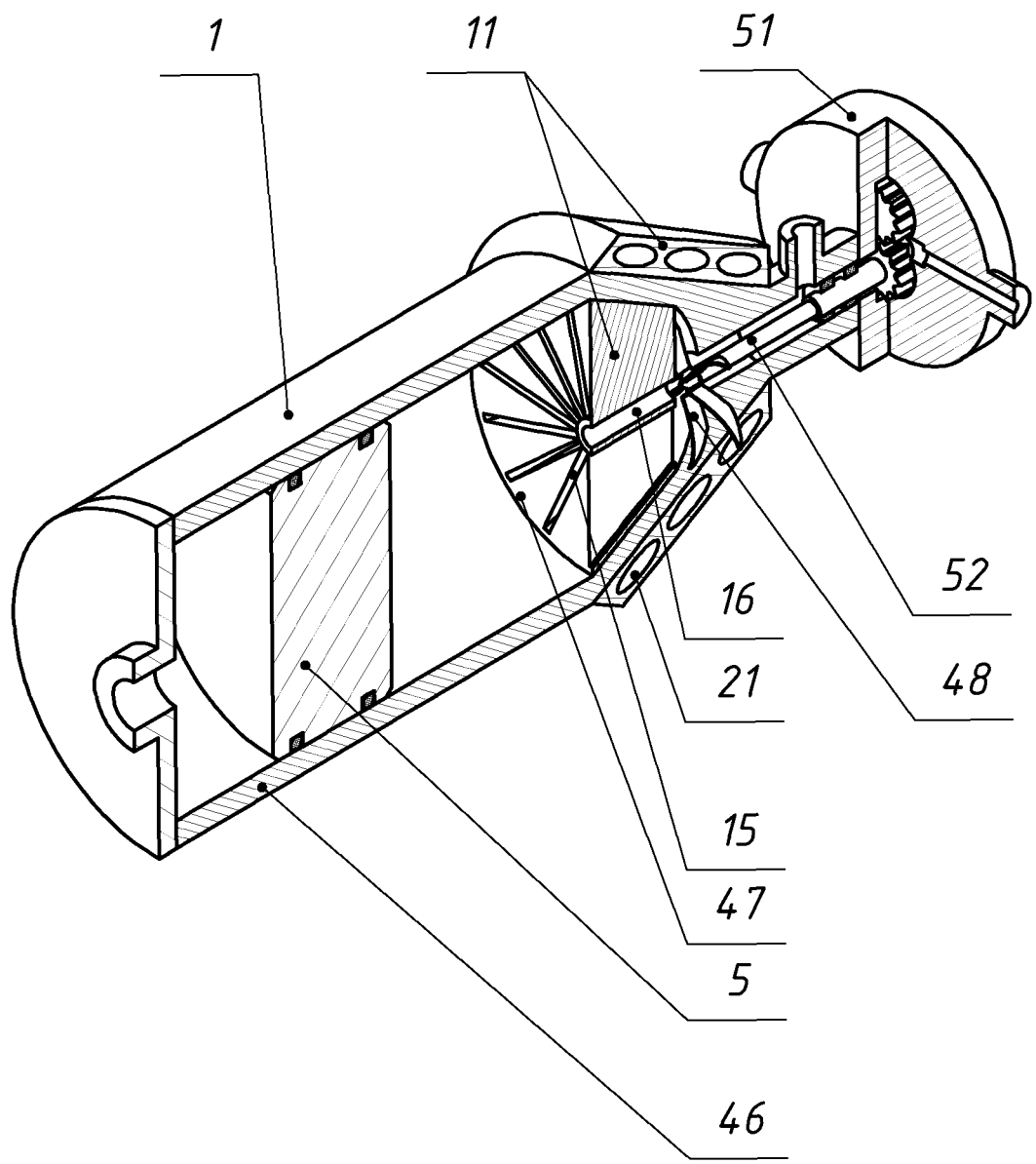

FIG. 6—The integrated embodiment of the accumulator, the gas flow heat exchanger and the gas blower actuated by the hydromotor.

Figure 7:
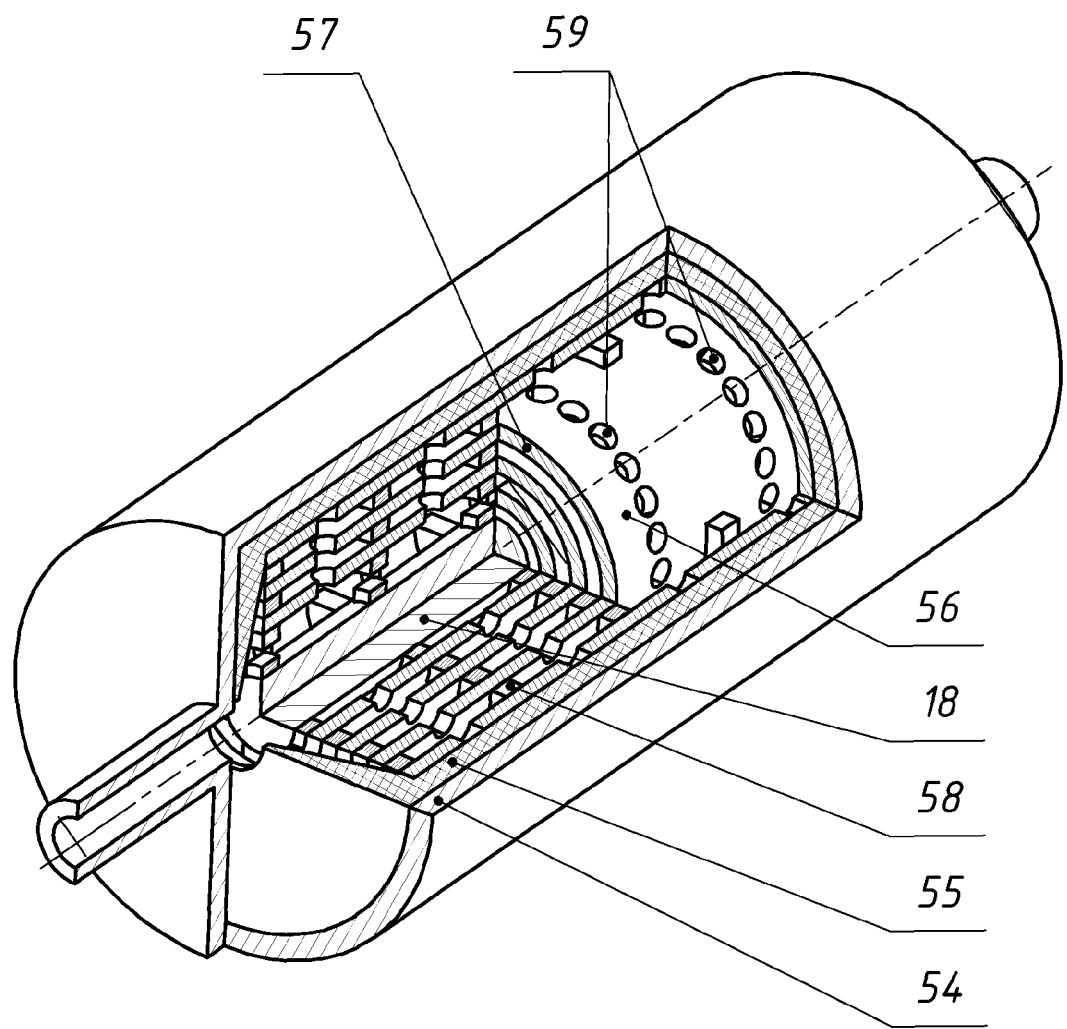

FIG. 7—The gas regenerating heat exchanger.

Figure 8:
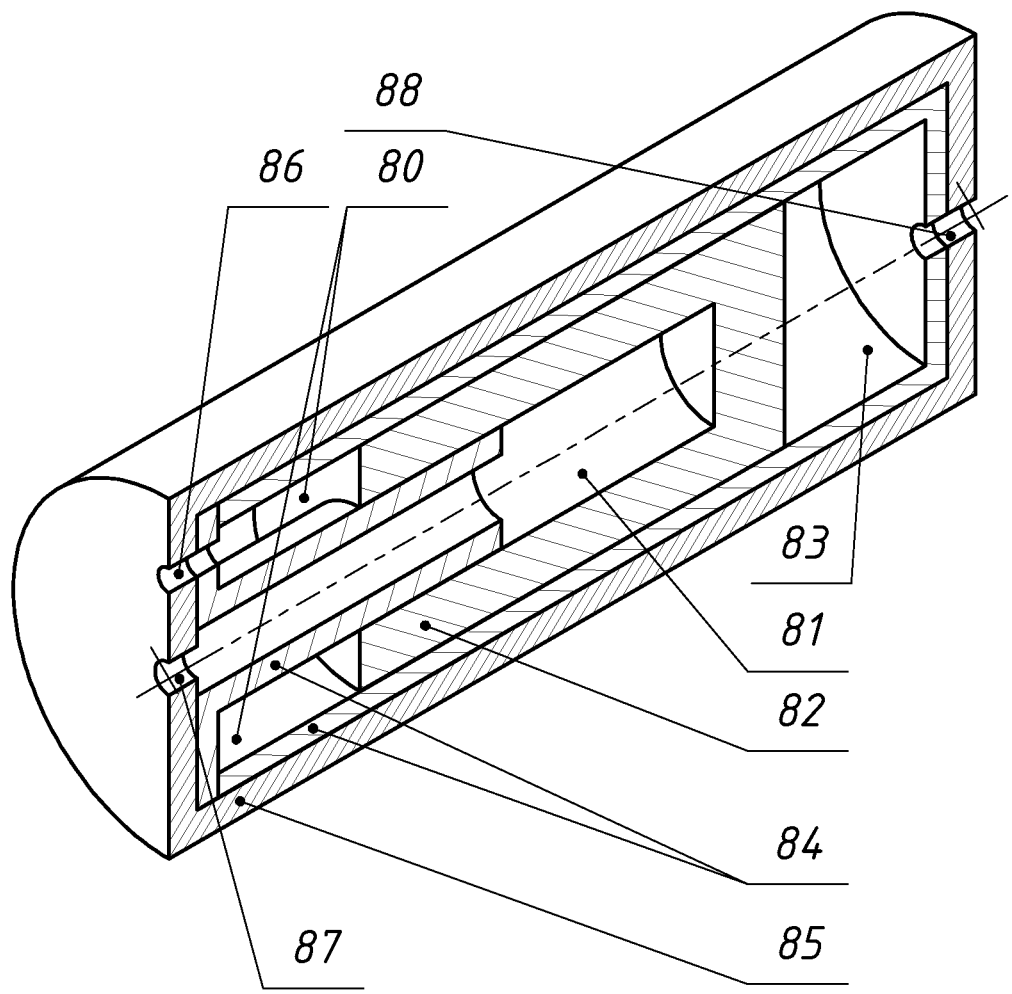

FIG. 8—The integrated embodiment of the non-adjustable hydraulic transformer and the liquid heat insulating buffer.

The primary principle of the proposed invention is illustrated in FIG. 1. Improvements of the primary principle are illustrated in FIG. 2. FIG. 3-FIG. 8 show particular embodiments of the main elements and parts.

The device according to FIG. 1 includes two hydropneumatic accumulators 1 and 2, which liquid reservoirs 3 and 4 communicate with the means for supply and intake of liquid 14. The liquid reservoirs 3 and 4 are separated by movable separators 5 and 6 from the gas reservoirs 7 and 8 communicating with the means of heating and cooling 9. For gas heating and cooling these means contain flow gas heat exchangers 10 and 11 connected with the gas reservoirs 7 and 8 and accumulators 1 and 2 via gas lines 12 and valves 13. The heat exchanger 10 is made with the possibility of a thermal contact with an external heat source and with the possibility of supplying heat to the gas from it. The heat exchanger 11 is made with the possibility of a thermal contact with the cooling heat transfer medium and with the possibility of removing heat to it from the gas.

The invention provides for use of heat of various sources, including internal or external combustion engines, high-temperature fuel cells, the sun, geothermal sources, etc. as well as direct heat of exothermic reactions conducted in a thermal contact with the hotter heat exchanger. The thermal contact with the heat source is effected either by means of heat conductivity or heat-and-mass transfer using a hot heat-transfer medium, for example, exhaust gases of an ICE (internal combustion engine) or exhaust steam of a steam turbine, or radiant heat transfer as well as their combinations. Provision is also made for heat-and-mass transfer with condensation heat transfer, for example, during recovery of the heat of exhaust steam of a steam turbine or in use of heat pipes.

FIG. 3 shows the embodiment of the gas heat exchanger 10 (or 11), the thermal contact with it being effected by means of heat and mass transfer. It contains internal slot-type gas channels 15 radially diverging from the internal axial channel 16, which greater part is blocked by the plug 18 except for the collector parts 17. Gas input and output are effected via the ports 19 in the flanges 20 (the second flange is not shown). It is preferred that the aggregate gas volume in the internal channels 15, 16 of the heat exchangers 10, 11 should not exceed 10% of the maximum aggregate gas volume in the gas reservoirs 7, 8 of the accumulators. For heat supply from an external source the heat exchanger according to FIG. 3 contains spiral external channels 21 through which the heating heat-transfer medium circulating between the heat exchanger 10 and external heat source is pumped via external ports (not shown in the figure). It is preferred that the heat exchanger 10 should be made and installed as a counterflow one with the possibility of supply heat from the heating heat-transfer medium to the gas so that the heat is supplied to the gas entering the heat exchanger 10 from the external heat-transfer medium leaving the heat exchanger 10 while the heat to the gas leaving the heat exchanger 10 is supplied from the external heat-transfer medium entering the heat exchanger 10. Thus, both fuller use of the heat of the external source and higher gas heating are achieved simultaneously. The heat exchanger with the cooling heat-transfer medium pumped through its external channels is embodied and installed in a similar way.

The gas heat exchanger 10 is heated from the external heat source and becomes hotter. The gas heat exchanger 11 is cooled by the cooling heat-transfer medium and becomes colder.

For conversion of the heat of an external source into fluid power, gas compression and expansion are combined with heat supply and removal so that the average gas temperature during expansion is higher than during compression. Compression and expansion hereinafter implies change of the gas density (increasing or decreasing of the density, respectively) due to the change of the gas reservoir volume in at least one accumulator.

The device according to FIG. 1 can be used for the conversion of heat into fluid power with performance of the cycles combining isobaric, isochoric and close to adiabatic polytrophic stages, for example, those of Otto, Brayton, Diesel or other cycles. Hereinafter the real processes in the gas cycle are approximately described by idealized stages (such as adiabatic, isothermal, isobaric or isochoric).

Gas density changing (by gas expansion or compression) without gas transfer through the heat exchanger implements polytropic expansion or compression that approaches the adiabatic one at increased rate of expansion or compression.

Gas transfer through the heat exchanger (hotter 10 or colder 11) without gas density change, (that is with equal rates of gas displacement from one accumulator and gas intake into another accumulator) implements isochoric change of the gas temperature (heating or cooling, respectively).

Gas transfer from one accumulator to another with expansion (that is with increase of the aggregate volume of the gas reservoirs 7 and 8) through the hotter heat exchanger 10 implements gas expansion with heating, isobaric for example. The similar way gas compression (isobaric for example) with cooling is implemented at gas transfer from one accumulator to another with compression through the colder heat exchanger 11.

The proposed method of heat conversion into fluid power is not limited to the cycles with the aforesaid idealized stages and applies to all cycles in which gas expansion work exceeds gas compression work.

The example of the conversion heat into fluid power cycle, which is implemented in the device embodiment according to FIG. 1, includes four stages: the first stage of the polytropic gas compression in the gas reservoir of the first accumulator; the second stage of the heat supply to the gas and gas heating during gas transferring to another accumulator through the hotter heat exchanger 10; the third stage of the polytropic gas expansion in the gas reservoir of another accumulator and the fourth stage of the heat removal from the gas and gas cooling during gas transferring backward to the first accumulator through the colder heat exchanger 11. At the 2 through the colder heat exchanger 11 into the gas reservoir 7 of the accumulator 1 in the maximal extent. As a result the initial gas temperature is close to the temperature of the colder heat exchanger 11. Pumping working fluid by means for supply and intake of liquid 14 into the liquid reservoir 3 of the accumulator 1 the polytropic gas compression is being performed in the gas reservoir 7 with the increase of gas pressure and temperature. The polytropic gas compression is finished at the gas temperature less than temperature of the hotter heat exchanger 10. During the second stage the heat is being supplied to the compressed gas by transferring the gas via valve 13 and hotter heat exchanger 10 from the gas reservoir 7 into the gas reservoir 8 with pumping working liquid into the liquid reservoir 3 and displacement of working liquid from the liquid reservoir 4. The supply of heat is performed with heating and expansion of the gas, i.e. with the increase of the aggregate gas volume in the gas reservoirs 7 and 8. The amount of the working fluid being displaced from the liquid reservoir 4 of the accumulator 2 into the means for supply and intake of liquid 14 is greater than that being pumped from these means into the liquid reservoir 3 of the accumulator 1. Preferably the gas transferring is performed until maximal displacement of the gas from the gas reservoir 7 of the accumulator 1. At the third stage further gas expansion is performed in the gas reservoir 8 of the accumulator 2 with the liquid displacement from its liquid reservoir 4 into the means for supply and intake of liquid 14. At this time the pressure and the temperature of the gas decrease. The polytropic gas expansion is finished at the gas temperature higher than the temperature of the colder heat exchanger 11. During the fourth stage the heat is being removed from the expanded gas by transferring the gas via colder heat exchanger 11 and valve 13 from the gas reservoir 8 into the gas reservoir 7 with pumping working liquid into the liquid reservoir 4 and displacement of working liquid from the liquid reservoir 3. The removal of heat is performed with cooling and compression of the gas, i.e. with the decrease of the aggregate gas volume in the gas reservoirs 8 and 7. The amount of the working fluid being displaced from the liquid reservoir 3 of the accumulator 1 into the means for supply and intake of liquid 14 is less than that being pumped from these means into the liquid reservoir 4 of the accumulator 2. The average temperature and the average pressure of the gas during expansion at the second and third stages are higher than during compression at the first and fourth stages. Therefore, the gas expansion work exceeds the gas compression work. During the second and third stages the means for supply and intake liquid 14 get more fluid power with the liquid displaced from the accumulators than is spent for the pumping of the working fluid into the accumulators during the first and fourth stages. As a result, some part of the heat is converted into additional fluid power that is used by means for supply and intake of liquid 14 for mechanical work in loads, in hydromotors or hydraulic cylinders, for example. Various embodiments of the means for supply and intake of liquid 14 are implied including both separate pumps and hydromotors and hydraulic transformers.

The above-described primary principle of the invention is implemented with higher efficiency using the improvements included in the device embodiment according to FIG. 2.

In the device according to FIG. 2 the means of heating and cooling 9 contain check valves 22 installed so that gas is transferred through the colder heat exchanger 11 only into the gas reservoir 7 of the accumulator 1 and thus the walls of the gas reservoir 7 are maintained colder. The hotter heat exchanger 10 is installed so that gas is transferred through it from the gas reservoir 7 into the gas reservoir 8 and from it-into the gas reservoir 23 of the third accumulator 24 thus maintaining the walls of the gas reservoirs 8 and 23 hotter.

In other embodiments with three and more accumulators the means of heating and cooling can be made with the possibility of maintaining the walls of the gas reservoirs of at least two accumulators colder and transferring gas between them through the colder gas heat exchanger.

The means of heating and cooling 9 also contain liquid flow heat exchanger 25 and check valves 26. The heat exchanger 25 is heated by heat from an external heat source, by means of a hot heat-transfer medium, for example. The working liquid directed into the liquid reservoir 4 of the accumulator 2 or into the liquid reservoirs 27, 28 of the accumulator 24 is passed through the heated liquid heat exchanger 25 maintaining the walls of said liquid reservoirs and the working liquid in them hotter. At that the walls of the liquid reservoir 3 of the accumulator 1 and the liquid in it remain colder. Thus the accumulators 2 and 24 are maintained hotter in whole, whereas whole accumulator 1 is maintained colder.

Other embodiments can implement a cooling liquid heat exchanger through which the working liquid is transferred at pumping to the liquid reservoir of the accumulator with colder walls of the gas reservoir (accumulator 1 in FIG. 1, FIG. 2 for example). Other embodiments can also implement accumulators provided with heat exchangers for direct heating or cooling of the accumulator walls.

In the device according to FIG. 2 the means for supply and intake of liquid 14 include the liquid regenerating heat exchanger 29 and heat-insulating buffer 30. In other embodiments only a liquid regenerating heat exchanger or only a heat-insulating buffer can be used. The liquid regenerating heat exchanger 29 is connected with liquid reservoirs 4, 27 and 28 of both hot accumulators with the possibility of removing heat from the liquid during its displacement through it from these accumulators into the heat-insulating buffer 30 and supplying the removed heat to the liquid during reverse transfer of the liquid from the buffer 30 into these accumulators. The working liquid directed from the hot accumulators 2 or 24 through the heat exchanger 29 is cooled transferring the heat from the liquid to the heat exchanger 29. The working liquid directed into the hot accumulators 2 or 24 through the same heat exchanger 29 in the reverse direction is heated transferring the heat from the heat exchanger 29 to the liquid. Thus, the temperature of the working liquid directed to the heat-insulating liquid buffer 30 including two liquid reservoirs of variable volume 31 and 32 and separated by a movable heat insulator 33 is reduced. The use of high-temperature working liquid (for example, organic or organic-silicon one) allows to raise its temperature to 300 C and higher.

For the use of different working liquids in the cold and hot accumulators it is possible to apply a separate liquid buffer including two variable-volume reservoirs separated by a movable separator. Or the liquid buffer 30 can be made with a liquid-tight movable heat-insulating separator 33.

Various embodiments of the liquid regenerating heat exchanger 29 are proposed including regenerating elements installed inside a strong shell as well as those made in the form of a single element with high thermal capacity and low heat transfer from its hotter part to the colder part (for example, in the form of a long pipe). In the integrated embodiment according to FIG. 4 the liquid regenerating heat exchanger 29 and the liquid heat-insulating buffer 30 according to FIG. 4 are embodied in a common outer strong shell 34 with liquid ports 35 and 36 on its flanges. Inside the strong shell 34 there is a thin-walled metal sleeve 37 with a movable heat insulator 33 with the sliding possibility installed in it in the form of a long hollow piston 38 separating the high-temperature and low-temperature variable-volume reservoirs 31 and 32. In the space 39 between the strong shell 34 and the metal sleeve 37 the filler 40 is placed (for example, mineral wool or foamed polymer) preventing convection of the high-temperature liquid with low heat conductivity filling that space. The cavity 41 inside the hollow piston 38 also contains the filler 40 and high-temperature liquid with low heat conductivity. In this case this liquid is the working liquid filled through the holes 42 in the sleeve 37 and the holes 43 in the walls of the hollow piston 38. This liquid provides hydrostatic unloading of the thin sleeve 37 and thin walls of the piston 38. In other embodiments it is possible to use a solid heat-protective insert made of a high-temperature material with low heat conductivity (preferably less than 1 W/(m*K), for example, made of high-temperature plastic (polyimide-like for example), instead of the thin-walled metal sleeve 37 and the layer of a heat-protective liquid separated by it along the strong shell 34. The movable heat-insulator 33 can be also made from a similar solid material with low heat conductivity.

The high-temperature variable-volume reservoir 32 communicates with the flow part 44 of the liquid regenerating heat exchanger 29 that is filled with regenerating elements 45. In this case they are embodied in the form of balls made of a high heat conductivity metal (aluminum, for example). To reduce the dimensions the regenerating elements 45 may contain materials undergoing phase transition during heat exchange with the passing liquid (for example, melting during heat removal from the liquid and crystallization during heat supply to the liquid).

In the embodiment according to FIG. 2 the gas heat exchanger 10 is made as a separate element and installed between the accumulators 2 and 24 with the possibility of transferring gas through it from the smaller gas reservoir 8 of the accumulator 2 into the larger gas reservoir 23 of the accumulator 24, thus approaching the gas expansion process closer to the isothermal one. To ensure compactness and lower pressure losses during gas transfer the embodiment according to FIG. 5 is proposed where the gas heat exchanger 10 is made in the same housing with the accumulator 2 as a gas port of this accumulator with increased area of the heat exchanging surface. It contains external channels 21 for the heating heat transfer medium, a strong shell 46 common with the accumulator 2 as well as the inner heat exchanging section 47 made of a high heat conductivity metal (preferably from copper or aluminum). In this section internal slot-type gas channels 15 are made radially diverging from the axial channel 16, with its greater part blocked by a plug 18 except for the collector part 17. In the embodiment with two hotter accumulators, as according to FIG. 2, gas is transferred through this hotter heat exchanger 10 during transfer to the hotter accumulator 2 from the colder accumulator 1 and during transfer from the smaller hotter accumulator 2 to the larger hotter accumulator 24.

Similarly, in other embodiments the colder gas heat exchanger 11 can be embodied in the same housing with the colder accumulator 1.

The means of heating and cooling 9 according to FIG. 2 include the gas blower 48 installed with the possibility of creating forced convection in the gas reservoir 7 of the colder accumulator 1. The gas reservoir 7 communicates with the means of heating and cooling 9 via at least two gas lines 49 and 50 with the possibility of gas removal by the gas blower 48 from the gas reservoir 7 via the gas line 49, transfer of the removed gas through the colder flow gas heat exchanger 11 and return of the gas to the same gas reservoir 7 via the other gas line 50. In other embodiments with an external heat exchanger the gas blower can be placed in the housing of the accumulator and can create forced convection without gas transfer through the external heat exchanger, thus approaching gas compression or expansion closer to the isothermal process only due to heat exchange with the walls of the gas reservoir.

The means for supply and intake of liquid 14 according to FIG. 2 include a hydromotor 51 kinematically connected with the gas blower 48 by means of the shaft 52. In other embodiments kinematical connection of the hydromotor with the gas blower may include a gear box for the gas blower rotation speed increase). The hydromotor 51 is connected with the liquid line 67 via valve 103 with the possibility of being actuated by the liquid flow between it and the liquid reservoir 3 of the accumulator 1.

In the integrated embodiment according to FIG. 6 both the flow gas heat exchanger 11 and the centrifugal gas blower 48 are embodied in the same housing with the accumulator 1. The gas blower 48 is connected with hydromotor 51 by means of the shaft 52. The check valves 22 (FIG. 2) are not shown on the FIG. 6. One of these valves can be embodied as a disc-valve installed at the face of the internal heat-exchanging section 47 with a possibility to lock the heat-exchanging slot channels 15. Another check valve can be installed in the axial channel 16. This integrated embodiment increases compactness and eliminates the need for gas lines that reduces total gas dynamic resistance.

When working liquid is pumped into the liquid reservoir 3 of the accumulator 1, it actuates the hydromotor 51 and the gas blower 48 kinematically connected with it. The centrifugal gas blower 48 (FIG. 6) intakes the gas from the gas reservoir 7 via the axial channel 16 and pumps it into the slot-type channels 15 of the heat exchanger 11 from which the gas goes back into the gas reservoir 7 where forced convection is created. The intensified heat exchange of the gas with the walls of the gas reservoir 7 and the surfaces of the slot-type channels 15 approaches the gas compression process in this gas reservoir closer to the isothermal one.

The liquid actuating the hydromotor 51 and the gas pumped by the gas blower 48 have close pressures and close temperatures, which promotes a favourable operating condition of the shaft 52 seals.

In other embodiments the gas blower can be installed with the possibility of creating forced convection in the gas reservoir of the hotter accumulator. Also in other embodiments the gas blower can be kinematically connected with the electric motor located in the high pressure cavity, preferably filled with liquid.

The device according to FIG. 2 includes a regenerating flow gas heat exchanger 53 to which heat is removed from gas when gas is transferred through it to the colder accumulator 1 and from which the heat removed from the gas is supplied back to the gas when the gas is transferred through it in the opposite direction, i.e. from the colder accumulator 1 to the hotter accumulator 2. At that its part which the gas enters from the colder accumulator 1 becomes colder while the opposite part which the gas enters from the hotter accumulators 2 or 24 becomes hotter. At the cooling stage heat from the gas is supplied to the regenerating heat exchanger 53 and then to the cooling heat transfer medium through the colder heat exchanger 11. At the heating stage heat is supplied to the gas first from the regenerating heat exchanger 53 and then from the external heat source through the hotter heat exchanger 10.

It is preferred that the aggregate gas volume in the regenerating heat exchanger 53 should not exceed 10% of the maximum aggregate gas volume in the gas reservoirs of the accumulators. The thermal capacity of the regenerating heat exchanger 53 exceeds the maximum aggregate thermal capacity of the gas (preferably not less than twice). The configuration of the regenerating heat exchanger (length, longitudinal and cross sections) and the heat conductivity of the material of the regenerating heat exchanger have been chosen so that the heat transfer from its hotter part to its colder part should be less than the heat transfer from the gas to the cooling heat transfer medium in the colder heat exchanger 11 (preferably, less than 30% of said heat transfer). Various embodiments of a regenerating heat exchanger 53 are proposed both including regenerating elements installed inside the strong hermetically sealed shell as well as embodied in the form of a single element with a small inner volume, high thermal capacity and low heat transfer from the hotter part to the colder part. In the particular embodiment according to FIG. 7 the regenerating gas heat exchanger 53 includes a strong shell 54 with the heat-insulating insert 55, with a regenerating element 56 placed inside it in the form of a spiraled sheet 57 with gaskets 58 determining the gaps between the layers of the spiral. Flowing through these gaps the gas exchanges heat with the surfaces of the regenerating element getting colder or hotter depending on the transfer direction. In this embodiment use is made of a metal sheet (preferably, from a low heat conductivity metal, stainless steel, for example). To reduce longitudinal heat conductivity the metal sheet 57 has the perforation 59, breaking the regenerating element into several sections with increased heat resistance between them in the zones of perforation the 59. In other embodiments the regenerating elements can be made from high-temperature plastics without perforation. The heat-protective insert 55 made from a high-temperature plastic or ceramics reduces heat losses of heating and cooling of the strong shell 54. In other embodiments it is possible to use a layer of heat-insulating liquid instead of the heat-protective insert 55, the liquid being separated from the gas part with the regenerating element by a thin metal sleeve (similarly to the heat-protective layer of liquid in the liquid regenerating heat exchanger 29 according to FIG. 4).

In other embodiments a part of the heat exchanger 10 (or 11) can be used as a gas regenerating heat exchanger 53. For that purpose an additional gas port is made in such a heat exchanger with the possibility of introducing gas into the heat exchanger while the means of heating and cooling contain at least one channel connecting the additional gas port with the gas reservoir 23 (or the gas reservoir 7) and contain a valve installed with the possibility of locking this channel.

Heat regeneration combined with approaching compression and expansion closer to isothermal processes provides high thermodynamic efficiency of heat conversion into the work performed by gas during displacement of the liquid from the accumulators.

The means for supply and intake of liquid 14 according to FIG. 2 include hydraulic transformer 60 and the valves 61, 62 and 63 that together with liquid lines 64-67 form the means of inter-accumulator liquid transfer made with the possibility of creating a liquid flow between the liquid reservoirs of the accumulators 1, 2 and 24.

The hydraulic transformer 60 has three liquid ports 68, 69 and 70. The port 68 is connected via the valves 63 and 103 with the liquid reservoir 3 of the accumulator 1, while the port 69 is connected through the valves 62, 26 and 63, liquid heat-insulating buffer 30 and the regenerating liquid heat exchanger 29 with the liquid reservoir 4 of the accumulator 2 or with the liquid reservoirs 27 and 28 of the accumulator 24. The third port 70 of the hydraulic transformer 60 is connected with the liquid line 71. When liquid flows through this third port 70, the liquid flow is created between the ports 68 and 69 of the hydraulic transformer 60 and, accordingly, between the liquid reservoirs of the accumulators with which these ports communicate.

The accumulator 24 according to FIG. 2 is embodied like in U.S. Pat. No. 5,971,027 and combines the functions of a hydropneumatic accumulator and a hydraulic transformer. It has 3 ports (the gas port 72 and the liquid ports 73 and 74) and includes two liquid reservoirs 27 and 28 separated by one common piston separator 75 from one gas reservoir 23. The means of inter-accumulator liquid transfer include valve 61 and the lines 64 and 65 for creation of a liquid flow between the liquid reservoir 27 of the accumulator 24 and the liquid reservoir 4 of the accumulator 2. The liquid reservoirs 27 and 28 are separated one from another, which allows maintaining different pressures in them so that the aggregate force of pressure of the liquid on the separator 75 balances the force of gas pressure on it. When gas is transferred from the gas reservoir 8 of the accumulator 2 into the gas reservoir 23 a counter-flow of liquid is created into the liquid reservoir 4 of the accumulator 2 from the liquid reservoir 27, maintaining the pressure in it higher than that in the gas reservoir 23. At that the pressure in the other liquid reservoir 28 connected with the hydraulic transformer 76 via the valve 62 (and via regenerating heat exchanger 29 and heat insulating buffer 30) is maintained at a lower level than in the gas reservoir 23. By varying the ratio between the flow rates through the ports 77, 78 and 79 of the hydraulic transformer 76 the pressure of the liquid flowing through its port 77, connected with the liquid reservoir 28, is varied. Thus by means of the hydraulic transformer 76 the pressure in the liquid reservoir 28 is maintained lower relative to the gas pressure in the gas reservoir 23. Due to aforesaid balance of the forces acting upon the separator 75 the pressure in the liquid reservoir 27 becomes increased relative to the gas pressure in the gas reservoir 23. At steady rate of mutual gas and liquid transfer between the accumulators 2 and 24 the value of this relative excess of the liquid pressure in the liquid reservoir 27 over gas pressure in the gas reservoir 23 corresponds to the value of the aggregate pressure drop on the separators 75 and 6 caused by friction and the pressure drop on the resistances of the gas-liquid circuit through which gas transfer and liquid counter-transfer occur. This circuit includes gas and liquid ports of the accumulators 1, 2 and 24, gas heat exchanger 10, as well as valves and lines. Since the pressure drop on said circuit increases with the increase of the rate of mutual gas and liquid transfer between the accumulators 2 and 24 for the transfer rate increase said value of the pressure excess in the liquid reservoir 27 relative to the pressure in the gas reservoir 23 is increased and it is decreased for the transfer rate decrease.

In other embodiments such an accumulator with several liquid reservoirs can be used as the second colder accumulator (or as the only hotter accumulator, for example, instead of the accumulator 2 according to FIG. 1). In this case during the back transfer of gas from it into the smaller accumulator (for example, into the accumulator 1 according to FIG. 1) a counterflow of liquid is created from the liquid reservoir of the smaller accumulator to one (or several) liquid reservoir of such an accumulator maintaining pressure in it lower than the gas pressure. At that the pressure in another liquid reservoir (or several other liquid reservoirs) of this accumulator is maintained higher than the gas pressure in its gas reservoir, by means of the hydraulic transformer as well, for example. Such an integrated accumulator embodiment with two liquid reservoirs combining the functions of accumulator and hydraulic transformer reduces inter-accumulator liquid transfer losses and improves the device compactness. In other integrated embodiments the accumulators can contain several liquid reservoirs as well as several gas reservoirs in one housing. From the perspective of the present invention the number of the accumulators in such integrated embodiments is equal to the number of independently moving separators between the gas and liquid reservoirs.

The hydraulic transformer 60 and valves 62, 63 are used for creating the liquid flow between the accumulator 2 and the accumulator 1 during gas transfer between them with heat supply from the regenerating heat exchanger 53 and hotter heat exchanger 10 as well as for creating the liquid flow between the liquid reservoirs 27, 28 of the accumulator 24 and liquid reservoir 3 of the accumulator 1 during gas transfer between the accumulators 24 and 1 with heat removal from gas to the regenerating heat exchanger 53 and colder heat exchanger 11. During gas transfer from the gas reservoir 7 to the gas reservoir 8 the liquid reservoir 3 is connected to the port 68 (via valves 103, 63) while the liquid reservoir 4 is connected to the port 69 (via valves 61, 26, 62, liquid regenerating heat exchanger 29 and liquid heat-insulating buffer 30). Maintaining (by means of hydraulic transformer 60) the pressure of the liquid in the liquid reservoir 3 at a higher value than the gas pressure in the gas reservoir 7, gas is displaced from the accumulator 1 to the accumulator 2 and a counterflow of liquid is created between the accumulators 2 and 1 through the ports 68, 69 of the hydraulic transformer 60 with the displacement of the differential flow of the liquid through its third port 70, line 71 and check valve 97 to line 90.

When gas is transferred from the gas reservoir 23 into the gas reservoir 7 of the accumulator 1 both liquid reservoirs 27 and 28 are connected with the port 69 of the hydraulic transformer 60 (via valves 61, 62 and the liquid regenerating heat exchanger 29 and the liquid heat-insulating buffer 30). With the hydraulic transformer 60 maintaining the liquid pressure in these liquid reservoirs at a higher value than the gas pressure in the gas reservoir 23, gas is displaced from the accumulator 24 to the accumulator 1 and a counterflow of liquid is created into the liquid reservoirs 27 and 28 from the liquid reservoir 3 of the accumulator 1 through the ports 68, 69 of the hydraulic transformer 60 with the delivery of the differential flow of the liquid through its third port 70, line 71 and check valve 97 from line 89. Thus, in both cases the hydraulic transformer 60 allows to overpower the aggregate pressure drop on resistances of the gas-liquid circuit including the gas and liquid ports of the accumulators 1, 2, 24, gas and liquid heat exchangers, liquid buffer, valves and lines, and, in addition, the pressure drop on separators caused by friction.

In the embodiment according to FIG. 2 the hydraulic transformer 60 is made as a variable one with the possibility of varying ratios between liquid flow rates through its ports 68, 69, 70 and thereafter with the possibility of maintaining different ratios between the pressures of liquid in these flows. In other embodiments the hydraulic transformer 60, that is used for the inter-accumulator transfer of liquid, can be made as a non-adjustable one, i.e. with constant ratio between liquid flow rates through its ports, for instance comprising three liquid reservoirs separated by one separator like accumulator 24. FIG. 8 shows an integrated embodiment of such hydraulic transformer combined with the heat-insulating liquid buffer. Two of its liquid reservoirs 80 and 81 are separated by one common heat-insulating piston separator 82 from a larger liquid reservoir 83. The heat-insulating piston separator 82 slides along a heat-insulating insert 84 installed inside a strong shell 85. During inter-accumulator transfer of gas and liquid the reservoirs 81 and 83 are used for the liquid exchange with the liquid reservoirs of the accumulators between which the liquid is being transferred. The larger reservoir 83 is connected to the hotter accumulator (e.g. to the accumulator 2 or 24, FIG. 2) and exchanges hotter liquid with it. The smaller reservoir 81 is connected to the colder accumulator (e.g. to the accumulator 1, FIG. 2) and exchanges colder liquid with it. A ratio of the cross-section areas of the reservoirs 83 and 81 is equal to the extent of the gas volume change at the stages of the gas transfer between the colder and the hotter accumulators through heat exchangers. The cross-section area of the third reservoir 80 is equal to the difference between cross-section areas of the reservoirs 83 and 81. Thereafter the liquid flow through the liquid port 86 is equal to the difference between the flows through the port 88 and port 87. The third reservoir 80 is used for the intake of the differential liquid flow during the gas transferring with the compression and for the displacement of the differential liquid flow during the gas transferring with the expansion. These heat-insulating piston separator 82 and insert 84 are made of heat-insulating materials (e.g. polyimide or another high-temperature plastics) which reduces the heat transfer through them between the hotter liquid in the reservoir 83 and the colder liquid in the reservoirs 80 and 81. A long sliding contact between the piston separator 82 and the insert 84 reduces heat losses on the cyclic heating and cooling of the part of the surface of the heat-insulating insert 84 that contacts to the hotter liquid in the reservoir 83. For the using of such integrated embodiment as a heat-insulating buffer only both smaller liquid reservoirs 80 and 81 are interconnected. Such integrated embodiment results in the reduction of the total hydrodynamic resistance and better compactness of the device.

In all the described cases of creation of the inter-accumulator liquid flow the rate of mutual exchange of gas and liquid between accumulators is changed by changing the pressure excess in the liquid reservoir of the respective accumulator over the gas pressure in the gas reservoir of the same accumulator for instance by regulating the respective hydraulic transformer or other hydromechanical means. Said rate can be changed by changing the extent of the gas temperature change during its transfer (for instance by changing the temperature of the heat exchangers 10 or 11) as well. The flow rate of the inter-accumulator liquid flow is chosen so as the pressure difference between any parts of the liquid in it (caused by the resistance of the aforementioned circuits and friction of the seals of the hydraulic transformers) does not exceed several bar, preferably does not exceed 1 bar. As the working pressures of the gas and liquid in the accumulators are dozens and hundreds bar, the pressure difference between any parts of the liquid in this flow does not exceed 30% of the liquid pressure in the liquid reservoir in which it is pumped to, preferably this difference does not exceed 5% of said pressure.

The means for supply and intake of liquid according to FIG. 2 contain the first line 89 and second line 90 equipped with accumulators 91 and 92 as well as a replenishment pump 93 with valves 94 and 95 with the possibility maintaining different pressures in these lines (in line 89—the first pressure changing in the first assigned range and in line 90—the second pressure changing in the second assigned range) as well as hydraulic transformer 76 with three ports 77, 78 and 80. Two of the ports 78 and 79 are connected to lines 89 and 90. The third port 77 is connected via valves 63, 62 and 61 with the liquid reservoir 3 of the accumulator) and with liquid reservoirs 27 and 28 of the accumulator 24. The hydraulic transformer 76 is embodied as a variable one with the possibility of varying (continuously or stepwise) ratio between liquid flow rates through its ports and thereafter ratio between pressures in these ports. Thus, at the stages with gas pressure changing the hydraulic transformer 76 ensures the possibility of liquid exchange between the two said lines 89, 90 and the said liquid reservoirs of accumulators 1, 2 or 24 at pressures different from the given first and second pressures in the lines 89, 90.

Both the first and second pressures in the lines 89, 90 are maintained at a high value (preferably, dozens or hundreds bar), with the second pressure being higher than the first one. To stabilize the pressure in the lines 89, 90 use is made of accumulators 91, 92 with larger working volumes than the aggregate working volume of the accumulators 1, 2 and 24. When the device is brought to its initial state, the replenishment pump 93 delivers liquid via the valves 94, 95 from the tank 96 into the accumulators 91, 92 until pressure is set in the first and second lines 89, 90 within the assigned first and second ranges, respectively.

Conversion is conducted as a cycle including the stage of gas compression in the accumulator 1 with the colder gas reservoir 7, the stage of gas transfer from it through the hotter heat exchanger 10 into the accumulator 2, the stage of gas transfer from the accumulator 2 into the accumulator 24 with gas expansion in their hotter gas reservoirs 8 and 23 as well as the stage of gas transfer from the accumulator 24 through the colder heat exchanger 11 into the accumulator 1.

Gas is compressed in the accumulator 1 from the pressure below the pressure in the line 89 to the pressure above the pressure in the line 90 by pumping working liquid into its liquid reservoir 3 by means of the hydraulic transformer 76 actuated by the liquid flow through its port 79 from the line 90. During the gas compression the liquid pressure in the liquid reservoir 3 of the accumulator 1 is being raised by regulating of the hydraulic transformer 76, namely by raising the ratio of the flow rate of the liquid delivered into the hydraulic transformer 76 via port 79 from line 90 to the flow rate of the liquid displaced from it via port 77 to the accumulator 1. The hydromotor 51 actuates the gas blower 48 that pumps gas through the heat exchanger 11, which results in heat removal from the gas and brings the gas compression process closer to the isothermal one.

After the liquid pressure in the liquid reservoir 3 has been raised up to the pressure above the second pressure (in the second line 90) the valves 62 and 63 are switched over to the stage of the gas transfer from the accumulator 1 into the accumulator 2 at the working liquid pressure in the accumulators exceeding the second pressure. The working liquid flow from the liquid reservoir 4 of the accumulator 2 to the line 90 actuates the hydraulic transformer 60 that creates the working liquid flow from the accumulator 2 to the accumulator 1. As a result gas is displaced from the gas reservoir 7 into the gas reservoir 8. In this case gas is transferred through the check valve 22, regenerating gas heat exchanger 53 and the hotter heat exchanger 10. Due to supply of heat to the gas from the regenerating heat exchanger 53 and the hotter heat exchanger 10 the gas heating goes on and expansion approaches the isobaric process.

Gas is expanded in the accumulators 2, 24 with hotter gas reservoirs 8, 23 from the pressure exceeding that in the line 90 to the pressure below the pressure in the first line 89 by displacing the working liquid from the liquid reservoir 28 to the line 89 through the hydraulic transformer 76 actuating it and creating the working liquid flow from it to the line 90. During the gas expansion the liquid pressure in the liquid reservoirs 28, 27, 4 of the accumulator 24 and 2 is being reduced by regulating of the hydraulic transformer 76, namely by raising the ratio of the flow rate of the liquid delivered into the hydraulic transformer 76 via port 77 from to the liquid reservoir 28 of the accumulator 24 to the flow rate of liquid displaced from it via the port 79 to the line 90. The pressure of the liquid flowing through the port 77 of the hydraulic transformer 76 from the liquid reservoir 28 is being maintained lower than the gas pressure in the gas reservoir 23. At the same time the other liquid reservoir 27 of the same accumulator 24 creates the pressure that is higher than the gas pressure while the liquid from the liquid reservoir 27 of the accumulator 24 is being transferred to the liquid reservoir 4 of the accumulator 2. The heat supply to the gas during gas transfer through the heat exchanger 10 brings the gas expansion process closer to the isothermal one.

After the liquid pressure in the liquid reservoir 3 has been reduced down to the pressure below the first pressure (in the first line 89) the valves 61, 62 and 63 are switched over to the stage of the gas transfer from the accumulator 24 with the hotter gas reservoir 23 into the accumulator 1 with the colder gas reservoir 7 which is conducted at the working liquid pressure in the accumulators below the first pressure. The working liquid flow from the line 89 (via respective check valve 97) to the liquid reservoirs 27, 28 of the accumulator 24 actuates the hydraulic transformer 60 that creates the working liquid flow from the accumulator 1 to the accumulator 24; hence, gas is displaced from the gas reservoir 23 into the gas reservoir 7. In this case gas is transferred through the regenerating gas heat exchanger 53, colder heat exchanger 11 and respective check valve 22. Due to heat removal from the gas to the regenerating heat exchanger 53 and colder heat exchanger 11 the gas is cooled and compressed, the process approaching the isobaric one.

As a result of every conversion cycle some part of the working liquid is transferred from the line 89 with the first pressure to the line 90 with the second, higher pressure. The approach of the compression and expansion to the isothermal processes and the gas heat regeneration between the stages of isobaric compression and expansion bring the gas cycle close to the Ericsson cycle of the second type (two isotherms and two isobars with heat regeneration between the isobars). The closer the gas compression and expansion to the isotherm and the closer the heat regeneration rate to 100%, the closer the thermodynamic efficiency of such a cycle to the thermodynamic limit, i.e. to the Carnot cycle efficiency.

The sliding seals of hydraulic transformers 60 and 76 (as well as the seals of the separator 75 of the accumulator 24) operate at differential pressures rather than at full ones, which reduce losses on leakages and friction and increase the hydromechanical efficiency of the conversion.

The means for supply and intake of liquid 14 according to FIG. 2 also include a hydraulic transformer 98 with four ports 99, 100, 101, 102. Two ports 99 and 100 are connected with the said first and second lines 89, 90 while the other two ports 101 and 102 are connected with two output lines 104 and 105. The hydraulic transformer 98 is embodied as a regulated one with the possibility of maintaining pressures in the output lines 104, 105 different from the pressures in the first and second lines 89, 90. The process of the above-described cyclic heat conversion into fluid power involves alternating stages with supply of the liquid from the first and second lines 89, 90 to the accumulators 1, 24 and intake of the liquid into the said lines 89, 90 from the accumulators 2, 24. Therefore, the pressure in these lines is subject to cyclic changes in the assigned first and second pressure ranges. Control of the pressure transformation rate in the hydraulic transformer ensures independence of the power transferred to the load 106 from these cyclic pressure fluctuations. When the first or second pressure goes beyond the assigned ranges due to leakages in the hydraulic transformer 76 or 98, these pressures are restored by means of a replenishment pump 93 and valves 94 and 95. Thus, the pressures are isolated optimizing the efficiency of the gas cycle by the choice of the given first and second pressures in the lines 89, 90 and optimizing the load 106 conditions by the choice of the high and low output pressures in the lines 104, 105.

As a result the heat transferred with small losses from the heat source to gas is converted with high thermodynamic efficiency into gas work that is transformed with high hydromechanical efficiency into fluid power transferred to the load.

Thus, the proposed method of heat conversion into fluid power and the device for its implementation provide:
  high rate of heat use due to inter-accumulator gas transfer through heat exchangers that eliminates heat losses of cyclic heating and cooling of massive elements, especially combined with elimination of gas heat losses at heat exchange with the walls of the accumulator as well as elimination of gas heat losses at heat exchange with liquids by preservation or regeneration of the working liquid heat;
  high thermodynamic efficiency of the gas cycle converting the heat supplied to the gas into work performed by the gas, especially combined with gas heat regeneration and in combination with gas compression or expansion processes approaching the isothermal ones;
  high hydromechanical efficiency of gas work conversion into fluid power due to inter-accumulator liquid transfer with small pressure differences by means of hydraulic transformers, especially in combination with isobaric exchange of liquid between the accumulators and lines at small pressure differences as well as in combination with the use of hydraulic transformers for liquid supply or intake at gas compression or expansion, respectively;

high general efficiency of heat conversion into fluid power transferred to the load due to combination of the aforesaid factors, especially in combination with the use of the hydraulic transformer ensuring pressure transformation in the lines exchanging liquid with the accumulators into the pressures in the lines exchanging liquid with the load;

high power density due to high gas and liquid pressures and high transformation efficiency;

increased reliability due to elimination of cyclic heating and cooling of the elements under high pressure;

possibility of accumulating heat in massive heat exchangers and using it for its conversion into fluid power during temporary shutdown or reduction of the heat source power.

Specialists understand that this detailed description is given as an example and many other variants within the limits of this invention may be proposed, including, for example, (but not limited to) implementations of the method that have not been described here in detail and differ by the type of the gas cycle, choice of working liquids and gases as well as the type of the external heat source and cooling heat transfer medium and specific features of the thermal contact with it, as well as embodiments of the device differing by the number and embodiments of the accumulators, gas and liquid heat exchangers, gas blowers, means for supply and intake of liquid, including hydraulic transformers and buffers and other components of the device as well as variants of integrated embodiments of the components of the device that were not described above.

The invention claimed is:

1. A method for conversion of heat energy into liquid fluid power, utilizing at least two hydropneumatic (hp) accumulators, wherein each hp accumulator includes:
   at least one hp accumulator bounding wall,
   an internal gas reservoir,
   an internal liquid reservoir, and
   a movable separator intermediate of the gas reservoir and the liquid reservoir, comprising:
   (a) adding working liquid to a first liquid reservoir of a first hp accumulator, wherein a first separator in the first hp accumulator moves to compress gas in a first gas reservoir of the first hp accumulator,
   (b) subsequent to commencement of (a), conducting gas from the first gas reservoir through a first heat exchanger, wherein the conducted gas absorbs heat energy from the first heat exchanger,
   (c) subsequent to commencement of (b), expanding gas that has been heated by passing through the first heat exchanger, in a second gas reservoir of a second hp accumulator, wherein a second separator of the second hp accumulator moves to cause working liquid to be expelled from a second liquid reservoir of the second hp accumulator,
   (d) subsequent to (c), adding working liquid to the second liquid reservoir, wherein the second separator moves to cause gas to be expelled from the second gas reservoir,
   (e) subsequent to commencement of (d), conducting gas from the second gas reservoir through a second heat exchanger wherein conducted gas is cooled and releases heat energy to the second heat exchanger,
   (f) subsequent to commencement of (e), receiving gas that has been cooled by passing through the second heat exchanger, in the first gas reservoir, wherein the first separator moves to cause working liquid to be expelled from the first liquid reservoir,
   (g) at least one of storing or using to power at least one device, at least a portion of liquid fluid power produced by expulsion of the working liquid in at least one of (c) and (f).

2. The method according to claim 1 wherein in (g) the liquid fluid power is stored by pressurizing working liquid in a liquid accumulator.

3. The method according to claim 1 wherein in (g) the liquid fluid power is used to cause operation of at least one of a hydraulic cylinder and a hydromotor.

4. The method according to claim 2 and further comprising:
   repeating steps (a) through (g) a plurality of times.

5. The method according to claim 4 and further comprising:
   (h) subsequent to at least one (g), releasing pressurized working liquid from the liquid accumulator to cause operation of at least one of a hydraulic cylinder and a hydromotor.

6. The method of claim 1 and further comprising:
   repeating (a) through (f) a plurality of times.

7. The method of claim 6 wherein in repeated (a) through (f) the at least one second bounding wall of the second hp accumulator is maintained at a higher temperature than the at least one first bounding wall of the first hp accumulator.

8. The method of claim 7 wherein in repeated (a) through (f) working liquid in the second liquid reservoir is maintained at a higher temperature than working liquid in the first liquid reservoir.

9. The method of claim 8 wherein in repeated (a) through (f) working liquid in the second liquid reservoir is maintained fluidly separated from working liquid in the first liquid reservoir through at least one movable heat insulator.

10. The method of claim 7 and further comprising:
    subsequent to commencement of each (d) and prior to each (e)
    (d1) conducting gas from the second gas reservoir through the first heat exchanger wherein the gas gains heat energy,
    (d2) subsequent to commencement of (d1), expanding gas heated in (d1) in a third gas reservoir of a third hp accumulator, wherein a third separator of the third hp accumulator moves to cause working liquid to be expelled from a third liquid reservoir of the third hp accumulator,
    (d3) subsequent to (d2), adding liquid to the third liquid reservoir, wherein the third separator moves to cause gas to be expelled from the third gas reservoir,
    wherein prior to each repeated (e), gas from the second gas reservoir is moved through the third gas reservoir in (d1) through (d3) before passing through the second heat exchanger.

11. The method according to claim 7 wherein the at least one of the first gas reservoir and the second gas reservoir is in operative connection with a gas blower, and
    wherein in at least one of each repeated (a) and (c), a gas blower operates to move gas and aid convective heat transfer.

12. The method according to claim 7 and further comprising:

subsequent to commencement of each (a) and prior to each (b)

(a1) conducting gas from the first gas reservoir through the second heat exchanger wherein the gas loses heat energy, (a2) subsequent to commencement of (a1), receiving gas cooled in (a1) in a third gas reservoir of a third hp accumulator, wherein a third separator of the third hp accumulator moves to cause working liquid to be expelled from a third liquid reservoir of the third hp accumulator, (a3) subsequent to (a2), adding liquid to the third liquid reservoir, wherein the third separator moves to cause gas to be expelled from the third gas reservoir, wherein prior to each repeated (b) gas from the first gas reservoir is moved through the third gas reservoir in (a1) through (a3) before passing through the second heat exchanger.

13. The method according to claim 7
wherein in each (a) the working liquid added to the first liquid reservoir is first passed through a first port of a hydraulic transformer,
wherein in each (b) working liquid expelled from the second liquid reservoir is passed through a second part of the hydraulic transformer,
wherein in each (e) working liquid added to the second liquid reservoir is first passed through the second port of the hydraulic transformer
wherein in each (f) working liquid expelled from the first liquid reservoir is passed through the first port of the hydraulic transformer.

14. The method according to claim 7
wherein in at least one of each (a) or (c) the first or second hp accumulator comprises
two liquid reservoirs and one gas reservoir, wherein the separator between the two liquid reservoirs and the one gas reservoir includes a piston that moves, and
wherein the liquid reservoirs are at different pressures.

15. Apparatus comprising:
a first hydropneumatic (hp) accumulator including
at least one first accumulator bounding wall,
    a first internal gas reservoir,
    a first internal liquid reservoir,
    a first movable separator configured to maintain fluidly separate the first gas reservoir and the first liquid reservoir,
a second hp accumulator including:
    at least one second accumulator bounding wall,
    a second internal gas reservoir,
    a second internal working liquid reservoir,
    a second movable separator configured to maintain fluidly separate the second gas reservoir and the second liquid reservoir,
a first heat exchanger, wherein the first heat exchanger is configured to deliver heat to gas passing therethrough,
a second heat exchanger, wherein the second heat exchanger is configured to take heat away from gas passing therethrough,
at least one working liquid manifold including at least one valve, wherein the at least one working liquid manifold is configured to be selectively operative to enable working liquid to be delivered to and expelled from each of the first liquid reservoir and the second liquid reservoir,
at least one gas manifold including at least one gas valve, wherein the at least one gas manifold is configured to be selectively operative to enable gas in the first gas reservoir to be movable through the first heat exchanger to the second gas reservoir, and gas in the second gas reservoir to be movable to the first gas reservoir through the second heat exchanger,
wherein the at least one liquid manifold is operative to cause working liquid to be added to the first liquid reservoir to cause the first separator to move and compress gas in the first gas reservoir, and
wherein with the gas in the first gas reservoir compressed, the at least one gas manifold is operative to enable gas to move from the first gas reservoir to the second gas reservoir through the first heat exchanger,
and wherein when the gas heated by passing through the first heat exchanger is delivered to the second gas reservoir, the at least one liquid manifold is operative to enable working liquid to be expelled from the second liquid reservoir responsive to second separator movement due to expansion of gas in the second gas reservoir,
and wherein the at least one liquid manifold after gas expansion in the second gas reservoir, is operative to cause working liquid to be added to the second liquid reservoir which is operative to cause the second separator to move,
and wherein when the second separator is moved responsive to working liquid added to the second liquid reservoir, the at least one gas manifold is operative to enable gas to move from the second gas reservoir to the first gas reservoir through the second heat exchanger,
and wherein when the gas cooled by passing through the second heat exchanger is delivered to the first gas reservoir, the at least one liquid manifold is operative to enable working liquid to be expelled from the first liquid reservoir due to movement of the first separator responsive to receipt of gas in the first gas reservoir.

16. The apparatus according to claim 15 and further comprising:
a working liquid accumulator, wherein the liquid accumulator is in operative connection with at least one of the first liquid reservoir and the second liquid reservoir,
wherein the liquid accumulator is operative to store at least a portion of fluid power produced by expulsion of working liquid from at least one of the first liquid reservoir and the second liquid reservoir.

17. The apparatus according to claim 15
wherein the at least one gas manifold and the at least one liquid manifold are configured to be operated in coordinated relation to repeatedly cause in a cycle:
working liquid to be added to the first liquid reservoir,
gas to move from the first gas reservoir to the second gas reservoir through the first heat exchanger,
working liquid to be expelled from the second liquid reservoir,
working liquid to be added to the second liquid reservoir,
gas to move from the second gas reservoir to the first gas reservoir through the second heat exchanger,
working liquid to be expelled from the first liquid reservoir.

18. The apparatus according to claim 17
wherein after a plurality of repeated occurrences of the cycle, the at least one first bounding wall has a lower temperature than the at least one second bounding wall.

19. The apparatus according to claim 18
wherein after a plurality of repeated occurrences of the cycle, the working liquid in the first liquid reservoir is cooler than the working liquid in the second liquid reservoir.

20. The apparatus according to claim 19
wherein the at least one liquid manifold includes a liquid buffer, wherein the liquid buffer includes two buffer liquid reservoirs and a movable heat insulator, wherein the movable heat insulator is operative to fluidly separate the two buffer liquid reservoirs within the buffer.

21. The apparatus according to claim 15 and further comprising:
a third hp accumulator including
at least one third accumulator bounding wall,
a third internal gas reservoir,
a third internal working liquid reservoir,
a third movable separator configured to fluidly separate the third gas reservoir and third liquid reservoir,
wherein the third accumulator is in operative gas connection with the at least one gas manifold, and in operative working liquid connection with the at least one liquid manifold,
and wherein the at least one gas manifold and at least one liquid manifold are configured to be operative in coordinated relation to repeatedly cause in a cycle:
working liquid to be added to the first liquid reservoir,
gas to move from the first gas reservoir to the second gas reservoir through the first heat exchanger,
working liquid to be expelled from the second liquid reservoir,
working liquid to be added to the second liquid reservoir,
gas to move from the second gas reservoir to the third gas reservoir through the first heat exchanger,
working liquid to be expelled from the third liquid reservoir,
working liquid to be added to the third liquid reservoir,
gas to move from the third gas reservoir to the first gas reservoir through the second heat exchanger, and
working liquid to be expelled from the first liquid reservoir.

22. The apparatus according to claim 17 and further comprising:
a gas blower, wherein the gas blower is operative to urge gas to move in the first gas reservoir to aid in convective heat transfer.

23. The apparatus according to claim 17 and further comprising:
a gas blower, wherein the gas blower is operative to urge gas to move in the second gas reservoir to aid in convective heat transfer.

24. The apparatus according to claim 17 and further comprising:
a liquid power accumulator in operative connection with the second liquid reservoir, wherein expulsion of the working liquid from the second liquid reservoir in each sequence increases liquid power stored in the power accumulator.

25. The apparatus according to claim 17 and further comprising:
a hydromotor, wherein the hydromotor is in operative driving connection with a gas blower, wherein the gas blower is in operative connection with at least one of the first gas reservoir and the second gas reservoir,
and wherein the hydromotor is driven by flow of working liquid.

26. The apparatus according to claim 15 and further comprising:
a third hp accumulator including
at least one third accumulator bounding wall,
a third internal gas reservoir,
a third internal working liquid reservoir,
a third movable separator configured to fluidly separate the third gas reservoir and third liquid reservoir,
wherein the third accumulator is in operative gas connection with the at least one gas manifold, and in operative working liquid connection with the at least one liquid manifold,
and wherein the at least one gas manifold and at least one liquid manifold are configured to be operative in coordinated relation to repeatedly cause in a cycle:
working liquid to be added to the first liquid reservoir,
gas to move from the first gas reservoir to the third gas reservoir through the second heat exchanger,
working liquid to be expelled from the third liquid reservoir,
working liquid to be added to the third liquid reservoir,
gas to move from the third gas reservoir to the second gas reservoir through the first heat exchanger,
working liquid to be expelled from the second liquid reservoir,
working liquid to be added to the second liquid reservoir,
gas to move from the second gas reservoir to the first gas reservoir through the second heat exchanger, and
working liquid to be expelled from the first liquid reservoir.

27. The apparatus according to claim 17
wherein the at least one liquid manifold includes at least one hydraulic transformer having at least three liquid ports,
wherein a first liquid port is in operative fluid connection with the first liquid reservoir, and wherein a second liquid port is in operative fluid connection with the second liquid reservoir.

28. The apparatus according to claim 17
wherein at least one of the first hp accumulator and the second hp accumulator comprises two second liquid reservoirs and a movable piston, wherein the movable piston separates the second gas reservoir from each of the two second liquid reservoirs.

29. The apparatus according to claim 21
wherein at least one of the first hp accumulator, the second hp accumulator and the third hp accumulator comprises two liquid reservoirs and a movable piston, wherein the movable piston separates the gas reservoir from each of the two liquid reservoirs.

30. The apparatus according to claim 26
wherein at least one of the first hp accumulator, the second hp accumulator and the third hp accumulator comprises two liquid reservoirs and a movable piston, wherein the movable piston separates the gas reservoir from each of the two liquid reservoirs.

31. The method according to claim 10
wherein in at least one of each (a), (c) or (d2) the first, second or third hp accumulator comprises
two liquid reservoirs and one gas reservoir, wherein the separator between the two liquid reservoirs and the one gas reservoir includes a piston that moves, and wherein the liquid reservoirs are at different pressures.

32. The method according to claim 12
wherein in at least one of each (a), (a2) or (c) the first, second or third hp accumulator comprises
two liquid reservoirs and one gas reservoir, wherein the separator between the two liquid reservoirs and the one gas reservoir includes a piston that moves, and wherein the liquid reservoirs are at different pressures.

* * * * *